United States Patent
Takada et al.

(10) Patent No.: US 11,242,458 B2
(45) Date of Patent: Feb. 8, 2022

(54) ORGANOPOLYSILOXANE EMULSION COMPOSITION AND RESIN COMPOSITION

(71) Applicant: Shin-Etsu Chemical Co., Ltd., Tokyo (JP)

(72) Inventors: Yuko Takada, Annaka (JP); Hanako Tawata, Annaka (JP); Saori Ubukata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 471 days.

(21) Appl. No.: 16/322,634

(22) PCT Filed: Jun. 8, 2017

(86) PCT No.: PCT/JP2017/021344
§ 371 (c)(1),
(2) Date: Feb. 1, 2019

(87) PCT Pub. No.: WO2018/029966
PCT Pub. Date: Feb. 15, 2018

(65) Prior Publication Data
US 2021/0292560 A1    Sep. 23, 2021

(30) Foreign Application Priority Data

Aug. 10, 2016  (JP) .............................. JP2016-157496

(51) Int. Cl.
*C08L 83/12*    (2006.01)

(52) U.S. Cl.
CPC ......... *C08L 83/12* (2013.01); *C08L 2205/025* (2013.01); *C08L 2205/035* (2013.01)

(58) Field of Classification Search
CPC .......... C08L 83/12; C08L 83/04; C08L 83/06; C08L 101/00; C08L 83/00; C08G 77/46; C08G 77/38; C08G 65/336
See application file for complete search history.

(56) References Cited

U.S. PATENT DOCUMENTS

| | | | | |
|---|---|---|---|---|
| 5,770,112 A | * | 6/1998 | Omura ..................... | A61Q 5/06 516/20 |
| 6,139,851 A | | 10/2000 | Omura et al. | |
| 6,316,545 B1 | * | 11/2001 | Sakuta ...................... | C08J 3/03 424/70.12 |

FOREIGN PATENT DOCUMENTS

| | | |
|---|---|---|
| JP | 64-63031 A | 3/1989 |
| JP | 1-210028 A | 8/1989 |
| JP | 7-330630 A | 12/1995 |
| JP | 10-324616 A | 12/1998 |
| JP | 3023250 B2 | 3/2000 |
| JP | 2000-234058 A | 8/2000 |
| JP | 2002-68941 A | 3/2002 |
| JP | 2003-24707 A | 1/2003 |
| JP | 3417567 B2 | 6/2003 |
| JP | 3633820 B2 | 3/2005 |
| JP | 2007-314919 A | 12/2007 |
| JP | 5186079 B2 | 4/2013 |
| JP | 2014-80713 A | 5/2014 |
| JP | 5646355 B2 | 12/2014 |
| WO | WO 2016/111225 A1 | 7/2016 |
| WO | WO 2017/122581 A1 | 7/2017 |

OTHER PUBLICATIONS

International Search Report (PCT/ISA/210) issued in PCT/JP2017/021344, dated Sep. 12, 2017.
Written Opinion (PCT/ISA/237) issued in PCT/JP2017/021344, dated Sep. 12, 2017.

* cited by examiner

*Primary Examiner* — Robert D Harlan
(74) *Attorney, Agent, or Firm* — Birch, Stewart, Kolasch & Birch, LLP

(57) ABSTRACT

By incorporating a polyoxyalkylene-modified organo(poly)siloxane compound having a specific structure as an emulsifier or emulsification aid, an organopolysiloxane having a high degree of polymerization can be easily emulsified. The obtained organpolysiloxane emulsion composition has excellent resistance to polar solvents including DMF and is dispersible in water. When incorporated into a resin composition of either the solvent-based type including an organic solvent or the water-based type, the emulsion composition can hence impart slipperiness, wear resistance, and glossiness without causing cissing or blushing.

6 Claims, No Drawings

ORGANOPOLYSILOXANE EMULSION COMPOSITION AND RESIN COMPOSITION

TECHNICAL FIELD

The present invention relates to an organopolysiloxane emulsion composition that includes a polyoxyalkylene-modified organopolysiloxane compound as an emulsifying agent or a co-emulsifying agent, and to a resin composition containing such an emulsion composition.

BACKGROUND ART

Resin compositions of urethane resins, acrylic resins and the like are divided into solvent-based systems which use an organic solvent to provide good film formability and water-based systems which, owing to concerns over environmental contamination, do not include organic solvents. Because of concerns having to do with organic solvents evaporating in the drying step and adversely affecting worker health, solvent-based resin compositions most often use high-boiling organic solvents such as N,N'-dimethylformamide (DMF).

Artificial leathers and synthetic leathers that have been internal addition treated or surface treated with a solvent-based or water-based resin composition are used in such applications as automobile seats, furniture and apparel, and are desired to have gloss, slickness and leveling ability. Highly polymerized polydimethylsiloxanes are included so as to satisfy the need for slickness and wear resistance. In order to make it possible to include polydimethylsiloxanes in both solvent-based resin compositions and water-based resin compositions, emulsification or the like must be carried out so as to enable the polydimethylsiloxane to disperse in both DMF and water. However, when a polydimethylsiloxane emulsion composition obtained by emulsification with a nonionic surfactant, an anionic surfactant or a cationic surfactant is included in a DMF or other solvent-based resin composition, it does not uniformly disperse, as a result of which the emulsified state cannot be maintained and the polydimethylsiloxane separates out. Also, when a highly polymerized polydimethylsiloxane emulsion composition is included in a resin composition of, for example, a urethane resin or an acrylic resin, cissing or blushing arise in the resin composition, which sometimes detracts from the appearance of artificial leathers or synthetic leathers obtained with the resin composition. Accordingly, there exists a desire for a highly polymerized polydimethylsiloxane emulsion composition which can disperse both in water and in polar solvents such as DMF, which when included in a urethane resin or an acrylic resin does not give rise to cissing and blushing of the film, and which imparts excellent slickness and gloss.

Emulsion compositions that are stable to solvents have hitherto been developed. Patents relating to emulsion compositions which include polar solvents such as alcohols are described below.

Patent Document 1: JP No. 3023250 discloses a water-in-oil type emulsion cosmetic which includes a cyclic silicone, a surfactant, a highly polymerized pendant polyoxyalkylene-modified silicone, ethanol and titanium oxide. A polyoxyalkylene-modified silicone wherein silicone side chains are modified with short-chain polyoxyalkylene groups is used, but this differs in structure from that of the polyoxyalkylene-modified organopolysiloxane compound included in the emulsion composition of the present invention. Also, an emulsion composition of a cyclic silicone is mentioned, and so the object of this art is not the emulsification of a highly polymerized organopolysiloxane.

Patent Document 2: JP No. 3417567 discloses an emulsion of an oil and a lower alcohol obtained with a pendant polyoxyalkylene-modified silicone. By using a pendant polyoxyalkylene-modified silicone as the emulsifying agent, the emulsion is stable even when it contains a high concentration of alcohol. This art uses a polyoxyalkylene-modified silicone having silicone side chains modified with short-chain polyoxyalkylene groups, which silicone differs in structure from the polyoxyalkylene-modified organopolysiloxane compound included in the emulsion composition of the present invention. Also, emulsion compositions wherein the base oil is a liquid paraffin, a higher alcohol, a silicone oil or the like are given as examples, and so the object of this art is not the emulsification of highly polymerized organopolysiloxanes.

Patent Document 3: JP No. 3633820 discloses an emulsion which is intended for use as a cosmetic and includes a polysiloxane obtained from a polyoxyalkylene-modified silicone that is modified at both ends, a powder treated for water repellency, and ethanol. Because the emulsion composition of the present invention does not include a treated powder, the compounding ingredients are different. Also, emulsion compositions containing cyclic siloxanes and 6 cs low-viscosity polysiloxanes as the base oil are mentioned as examples, and so the object of this art is not the emulsification of highly polymerized organopolysiloxanes.

Patent Document 4: JP No. 5646355 discloses an emulsion which is intended for use as a cosmetic and includes a polydimethylsiloxane, a polyether-modified silicone and a lower alcohol. The polydimethylsiloxane has a viscosity of from 20 to 10,000 mm$^2$/s, which differs from the viscosity of the organopolysiloxane of the present invention.

In addition, patents relating to resin compositions obtained by formulating a urethane resin composition for artificial leathers or synthetic leathers with a polydimethylsiloxane are described.

Patent Document 5: JP-A 2014-80713 discloses the admixture of a solid dimethylsilicone with a urethane resin, and the use of the resulting composition as a surface treatment agent for synthetic leathers. A non-emulsified dimethylsilicone is used, and appears to be incapable of being blended into a water-based resin composition. Accordingly, this does not disperse in solvent-based or water-based resin compositions, and so this art differs from the emulsion composition of the present invention.

Patent Example 6: JP-A 2007-314919 discloses a water-based resin composition which includes, together with a urethane resin: a polyisocyanate crosslinking agent, a silicone compound and a filler. The silicone compound is a polyether-modified silicone. Hence, this art differs from the emulsion composition of the present invention which is obtained by emulsifying a highly polymerized organopolysiloxane.

In addition, a patent relating to a paint that includes a polydimethylsiloxane and a polyalkylene-modified organopolysiloxane is described.

Patent Example 7: JP 5186079 discloses a paint additive which is a mixture of a nonionic surfactant and a silicone modified at one end with a polyether, which can persistently impart a slight degree of hydrophilicity to the surface of a coating film, and the purpose of which is to exhibit an ability to prevent fouling by aquatic organisms over an extended period of time. The present invention was developed with the object of imparting slickness and wear resistance to synthetic leathers, artificial leathers and the like used in automobiles and bags. Hence, the art described here differs from the present invention both in its makeup and in the intended use.

PRIOR ART DOCUMENTS

Patent Documents

Patent Document 1: JP 3023250
Patent Document 2: JP 3417567
Patent Document 3: JP 3633820
Patent Document 4: JP 5646355
Patent Document 5: JP-A 2014-80713
Patent Document 6: JP-A 2007-314919
Patent Document 7: JP 5186079

SUMMARY OF INVENTION

Technical Problem

It is therefore an object of the present invention to provide an organopolysiloxane emulsion composition in which a highly polymerized organopolysiloxane capable of dispersing in both organic solvents such as DMF and in water is emulsified. Another object is to provide a resin composition formulated with the organopolysiloxane emulsion composition, which resin composition is useful as a surface treatment agent or an internally added treatment agent that imparts slickness and wear resistance to synthetic leathers and artificial leathers used in automobiles and bags without giving rise to cissing and blushing.

Solution to Problem

The inventors have conducted extensive investigations in order to achieve the above objects. As a result, they have discovered that a highly polymerized organopolysiloxane can be easily emulsified by using a polyoxyalkylene-modified organo(poly)siloxane compound of a specific structure as an emulsifying agent or a co-emulsifying agent. They have also found that, because the resulting organopolysiloxane emulsion composition has an excellent solvent resistance to polar solvents such as DMF and disperses in water as well, whether included in a solvent-based resin composition that uses an organic solvent or in a water-based resin composition, it is able to impart slickness and wear resistance without giving rise to cissing and blushing. These discoveries ultimately led to the present invention.

Accordingly, this invention provides the following organopolysiloxane emulsion composition and resin composition.

[1]

An organopolysiloxane emulsion composition which includes:

(A) from 1 to 50 parts by weight of a polyoxyalkylene-modified organopolysiloxane compound of general formula (1) below

[Chem. 1]

$$(LR_2SiO_{1/2})_a(R_3SiO_{1/2})_b(R_2SiO_{2/2})_c(RSiO_{3/2})_d(SiO_{4/2})_e \quad (1)$$

[wherein L is a monovalent organic group of general formula (2) below

[Chem. 2]

$$-CH_2-CH_2-(CH_2)_{r1}-O-(EO)_{s1}-(AO)_{t1}-R^1 \quad (2)$$

(EO being an oxyethylene group; AO being a linear or branched oxyalkylene group of 3 to 10 carbon atoms; $R^1$ being a linear or branched, substituted or unsubstituted alkyl group of 1 to 10 carbon atoms, a hydrogen atom, a carboxyl group, an acyl group of 2 to 10 carbon atoms or a phenyl group; r1 being an integer from 0 to 10; s1 being an integer from 1 to 100; t1 being an integer from 0 to 150; and the sum s1+t1 being 15 or more); each R, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; b is an integer from 0 to 2; c is an integer from 100 to 1,000; d is 0 or 1; and e is 0 or 1];

(B) from 1 to 50 parts by weight of a polyoxyalkylene-modified organosiloxane compound of general formula (3) below

[Chem. 3]

$$R^2-\underset{\underset{R^2}{|}}{\overset{\overset{R^2}{|}}{Si}}-O-\underset{\underset{R^2}{|}}{\overset{\overset{L^1}{|}}{Si}}-O-\underset{\underset{R^2}{|}}{\overset{\overset{R^2}{|}}{Si}}-R^2 \quad (3)$$

[wherein $L^1$ is a monovalent organic group of general formula (4) below

[Chem. 4]

$$-CH_2-CH_2-(CH_2)_{r2}-O-(EO)_{s2}-(AO)_{t2}-R^3 \quad (4)$$

(EO being an oxyethylene group; AO being a linear or branched oxyalkylene group of 3 to 10 carbon atoms; $R^3$ being a linear or branched, substituted or unsubstituted alkyl group of 1 to 10 carbon atoms, a hydrogen atom, a carboxyl group, an acyl group of 2 to 10 carbon atoms or a phenyl group; r2 being an integer from 0 to 10, s2 being an integer from 1 to 15, t2 being an integer from 0 to 15, and the sum s2+t2 being from 3 to 20); and each $R^2$, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms];

(C) from 0 to 50 parts by weight of a surfactant;

(D) 100 parts by weight of an organopolysiloxane having the average compositional formula (12) below and a viscosity at 25° C. of at least 1,000,000 mPa·s $$R^4_fSiO_{(4-f)/2} \quad (12)$$

(wherein each $R^4$, which may be the same or different, is a hydrogen atom, a hydroxyl group, a linear or branched, unsubstituted or halogen atom, hydroxyl group, amino group or aminoalkylamino group-substituted alkyl group of 1 to 20 carbon atoms, an alkenyl group of 2 to 20 carbon atoms, an aryl group of 6 to 20 carbon atoms or an aralkyl group of 7 to 20 carbon atoms; and f is a positive number from 1.8 to 2.2); and (E) from 0 to 10,000 parts by weight of water.

[2]

The organopolysiloxane emulsion composition of [1], wherein the polyoxyalkylene-modified organopolysiloxane compound (A) is a polyoxyalkylene-modified organopolysiloxane compound having a monovalent organic group L of general formula (5) below at both ends

[Chem. 5]

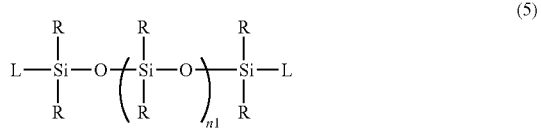
(5)

(wherein L and R are as defined above, and n1 is an integer from 100 to 1,000).

[3]

The organopolysiloxane emulsion composition of [1] or [2], wherein the organopolysiloxane (D) has a viscosity at 25° C. of at least 5,000,000 mPa·s.

[4]

The organopolysiloxane emulsion composition of any of [1] to [3], wherein the emulsion in the emulsion composition has an average particle size of not more than 20 μm.

[5]

The organopolysiloxane emulsion composition of any of [1] to [4] wherein, in the organopolysiloxane (D), the $R^4$ group of formula (12) is a methyl group, a phenyl group or a hydroxyl group.

[6]

A resin composition comprising an organic solvent or aqueous dispersion of a resin selected from the group consisting of urethane resins, epoxy resins, phenolic resins, melamine resins, urea resins, alkyd resins, polyimide resins, polyethylene, polypropylene, polyvinyl chloride, polystyrene, polyvinyl acetate, polytetrafluoroethylene, acrylonitrile-butadiene-styrene resins, acrylonitrile-styrene resins and acrylic resins; and the organopolysiloxane emulsion composition of any of [1] to [5].

Advantageous Effects of Invention

The organopolysiloxane emulsion composition of the invention is capable of dispersing both in water and in polar solvents such as DMF. When the organopolysiloxane emulsion composition is included in a solvent-based resin composition that uses an organic solvent or in a water-based resin composition and is used as a surface treatment agent or an internally added treatment agent for synthetic leather or artificial leather, slickness and gloss can be imparted without the occurrence of cissing and blushing.

DESCRIPTION OF EMBODIMENTS

The invention is described in detail below.

[Organopolysiloxane Emulsion Composition]

The organopolysiloxane emulsion composition of the invention is characterized by including:

(A) from 1 to 50 parts by weight of a polyoxyalkylene-modified organopolysiloxane compound of general formula (1) below, (B) from 1 to 50 parts by weight of a polyoxyalkylene-modified organosiloxane compound of general formula (3) below, (C) from 0 to 50 parts by weight of a surfactant, (D) 100 parts by weight of an organopolysiloxane of the average compositional formula (12) below which has a viscosity at 25° C. of at least 1,000,000 mPa·s, and (E) from 0 to 10,000 parts by weight of water.

[(A) Polyoxyalkylene-Modified Organopolysiloxane Compound]

The polyoxyalkylene-modified organopolysiloxane compound serving as component (A) is a compound of general formula (1) below.

[Chem. 6]

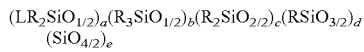
(1)

Here, L is a polyoxyalkylene group of general formula (2) below

[Chem. 7]

(2)

(wherein EO represents an oxyethylene group; AO represents a linear or branched oxyalkylene group of 3 to 10 carbon atoms; $R^1$ is a linear or branched, substituted or unsubstituted alkyl group of 1 to 10 carbon atoms, a hydrogen atom, a carboxyl group, an acyl group of 2 to 10 carbon atoms or a phenyl group; r1 is an integer from 0 to 10; s1 is an integer from 1 to 100; t1 is an integer from 0 to 150; and the sum s1+t1 is 15 or more). Each R, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; b is an integer from 0 to 2; c is an integer from 100 to 1,000; d is 0 or 1; and e is 0 or 1.

By having the polyoxyalkylene-modified organopolysiloxane compound of component (A) serve as a co-emulsifying agent or emulsifying agent for the subsequently described organopolysiloxane (D), a highly polymerized organopolysiloxane can be easily emulsified and the particle size of the emulsion can be made small. In particular, an organopolysiloxane (D) having a viscosity of 20,000,000 mPa·s or more is difficult to emulsify with the surfactant (C) alone, but can be easily emulsified by including the polyoxyalkylene-modified organopolysiloxane compound (A). By including a polyoxyalkylene-modified organopolysiloxane compound (A), the organopolysiloxane emulsion composition of the invention manifests solvent resistance and salt resistance.

In formula (1) above, each R, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms. Examples of linear or branched, substituted or unsubstituted alkyl groups of 1 to 20 carbon atoms include alkyl groups such as methyl, ethyl, propyl, isopropyl, butyl, isobutyl, tert-butyl, pentyl, neopentyl, hexyl and octyl groups; and halogen-substituted alkyl groups such as chloromethyl, chloropropyl, bromoethyl and trifluoropropyl groups. Examples of aryl groups of 6 to 20 carbon atoms include phenyl, tolyl, xylyl and naphthyl groups. Examples of aralkyl groups of 7 to 20 carbon atoms include benzyl, phenylethyl and phenylpropyl groups. Examples of alkoxy groups of 1 to 20 carbon atoms include methoxy, ethoxy and propoxy groups. R is preferably a linear or branched, substituted or unsubstituted alkyl group of 1 to 20 carbon atoms, or an aryl group of 6 to 20 carbon atoms. From the standpoint of versatility, a methyl group or a phenyl group is more preferred.

The subscript a is an integer of 2 to 4; the subscript b is an integer of 0 to 2; the subscript c is an integer of 100 to 1,000, preferably an integer of 150 to 800, and more preferably an integer of 200 to 600; the subscript d is 0 or 1; and the subscript e is 0 or 1.

L is a monovalent organic group of above formula (2).

In formula (2), $R^1$ is a linear or branched, substituted or unsubstituted alkyl group of 1 to 10 carbon atoms, a hydrogen atom, a carboxyl group, an acyl group of 2 to 10 carbon atoms or a phenyl group. Examples of linear or branched, substituted or unsubstituted alkyl groups of 1 to 10 carbon atoms include alkyl groups such as methyl, ethyl, propyl, isopropyl, butyl, isobutyl, tert-butyl, pentyl, neopentyl, hexyl and octyl groups; and halogen-substituted alkyl groups such as chloromethyl, chloropropyl, bromoethyl and trifluoropropyl groups. Examples of acyl groups of 2 to 10 carbon atoms include acetyl and octanoyl groups. $R^1$ is preferably a linear or branched, substituted or unsubstituted alkyl group of 1 to 10 carbon atoms, or a hydrogen atom. In terms of the ease of synthesis, a hydrogen atom is more preferred.

EO represents an oxyethylene group, and AO represents a linear or branched oxyalkylene group of 3 to 10 carbon atoms. Examples of AO include oxypropylene, oxybutylene and oxytetramethylene groups.

Also, the subscript r1 is an integer from 0 to 10, the subscript s1 is an integer from 1 to 100, the subscript t1 is an integer from 0 to 150, and the sum s1+t1≥15. It is preferable for s1 to be an integer from 1 to 80 and t1 to be an integer from 0 to 100, and more preferable for s1 to be an integer from 3 to 50 and t1 to be an integer from 3 to 50. When s1 is larger than 100 or t1 is larger than 150, the polyoxyalkylene-modified organopolysiloxane compound (A) has too high a viscosity and becomes difficult to handle. The sum s1+t1 in the average structural formula for one molecule is 15 or more, preferably at least 15 and up to 250, and more preferably at least 25 and up to 180. At less than 15, the solvent resistance of the organopolysiloxane emulsion composition formulated with the polyoxyalkylene-modified organopolysiloxane compound (A) decreases and, when the organopolysiloxane emulsion composition is dispersed in a polar solvent such as an alcohol or a ketone, the organopolysiloxane emulsion composition breaks down and the silicone ingredient separates out. At more than 25, when the organopolysiloxane emulsion composition of the invention is included in a urethane resin or an acrylic resin, the gloss of the film increases.

EO and AO may be in a block or random arrangement. The subscript r1 should satisfy the above-indicated value, although from the standpoint of versatility, r1 is most preferably 1.

The monovalent organic group of formula (2) is exemplified by, but not limited to, groups of the following general formulas.

[Chem. 8]

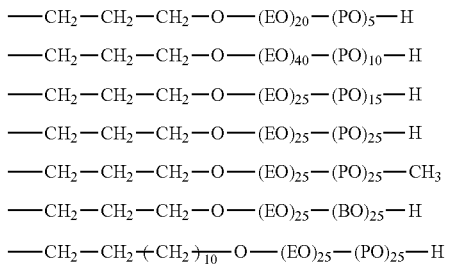

In these formulas, EO stands for ethylene oxide, PO stands for propylene oxide, and BO stands for butylene oxide. EO, PO and BO may be in a random or block arrangement.

Of the polyoxyalkylene-modified organopolysiloxane compounds of above formula (1), component (A) is preferably a linear polyoxyalkylene-modified organopolysiloxane compound of general formula (5) below having a monovalent organic group L at both ends

[Chem. 9]

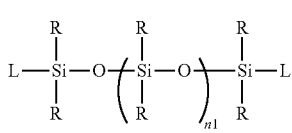

(5)

(wherein L and R are as defined above, and the subscript n1 is an integer from 100 to 1,000).

In formula (5), n1 is an integer from 100 to 1,000, preferably an integer from 150 to 800, and more preferably an integer from 200 to 600. When n1 is smaller than 100, the solvent resistance of the organopolysiloxane emulsion composition containing the polyoxyalkylene-modified organopolysiloxane compound (A) decreases and films of the inventive organopolysiloxane emulsion composition-containing resin composition have decreased gloss and slickness. When n1 is larger than 1,000, the polyoxyalkylene-modified organopolysiloxane compound (A) has a higher viscosity and becomes difficult to handle. Also, the emulsifying power of the polyoxyalkylene-modified organopolysiloxane compound (A) decreases and so the emulsion within the inventive organopolysiloxane emulsion composition does not achieve a small average particle size.

In cases where two or more types of polyoxyalkylene-modified organopolysiloxane compound (A) are mixed together, the average structural formula should satisfy the range specified above.

The polyoxyalkylene-modified organopolysiloxane compound serving as component (A) is exemplified by, but not limited to, compounds of the following formulas.

[Chem. 10]

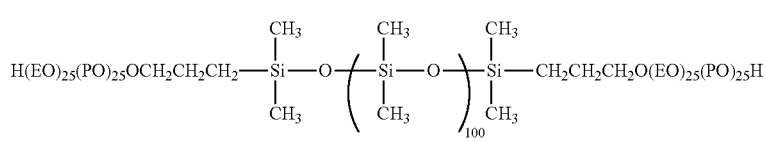

-continued

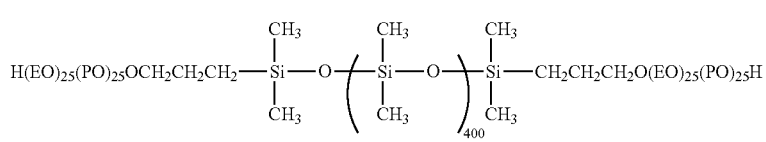

[Chem. 11]

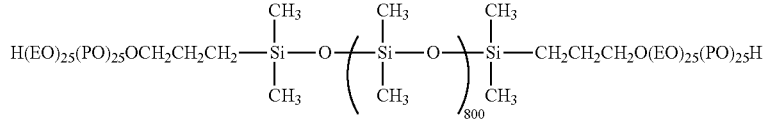

[Chem. 12]

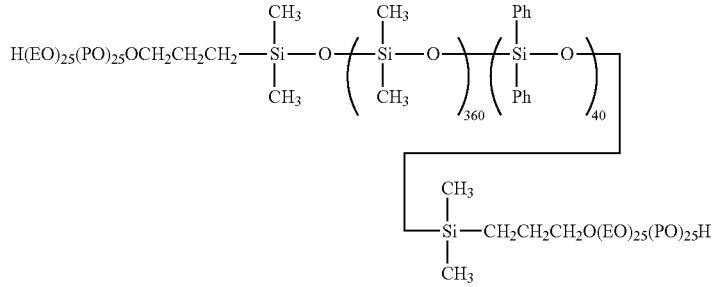

[Chem. 13]

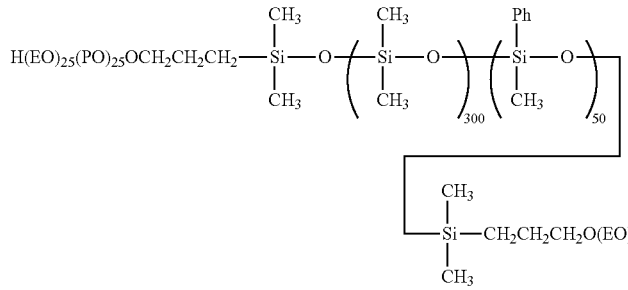

[Chem. 14]

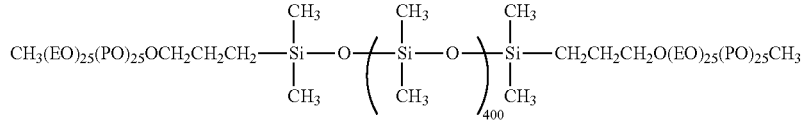

[Chem. 15]

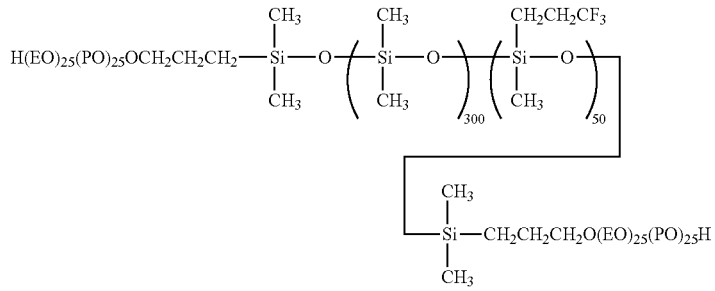

[Chem. 16]

In these formulas, Ph stands for a phenyl group, EO stands for ethylene oxide, and PO stands for propylene oxide. EO and PO may be in a block or random arrangement. Also, the siloxane units enclosed in parentheses may be randomly bonded.

The polyoxyalkylene-modified organopolysiloxane compound (A) has a molecular weight of preferably from 8,500 to 100,000, more preferably from 10,000 to 90,000, and even more preferably from 25,000 to 90,000. At a molecular weight below 8,500, the solvent resistance of the organopolysiloxane emulsion composition that includes the polyoxyalkylene-modified organopolysiloxane compound (A) may decrease, whereas at more than 100,000, the viscosity is high and handling may be difficult. Here and below, the molecular weight is the polystyrene-equivalent weight-average molecular weight obtained by gel permeation chromatography (GPC) with the HLC 8220 system from Tosoh Corporation and using tetrahydrofuran (THF) as the solvent.

The polyoxyalkylene-modified organopolysiloxane compound (A) has a viscosity of preferably at least 5,000 mPa·s, more preferably at least 10,000 mPa·s, and even more preferably at least 50,000 mPa·s. When the n1 value in above formula (5) and the s1 or t1 value in formula (2) are large, the polyoxyalkylene-modified organopolysiloxane compound (A) is in the form of a grease or solid. At a viscosity below 5,000 mPa·s, the solvent resistance of the organopolysiloxane emulsion composition containing the polyoxyalkylene-modified organopolysiloxane compound (A) may decrease and films of the inventive organopolysiloxane emulsion composition-containing resin composition may have a decreased gloss. Here and below, the viscosity is a value measured at 25° C. using a BM- or BH-type rotational viscometer.

As shown in formula (1), molecules of the polyoxyalkylene-modified organopolysiloxane compound (A) may include not only [LR$_2$SiO$_{1/2}$] units, [R$_3$SiO$_{1/2}$] units and [R$_2$SiO$_{2/2}$] units, but also [RSiO$_{3/2}$] units and [SiO$_{4/2}$] units. By including [RSiO$_{3/2}$] units and [SiO$_{4/2}$] units within molecules of the polyoxyalkylene-modified organopolysiloxane compound (A), there is a possibility that a film of the organopolysiloxane emulsion composition-containing resin composition will have an improved wear resistance.

Preparation of the polyoxyalkylene-modified organopolysiloxane compound (A) may be carried out by a known method.

One example is the synthesis of a polyoxyalkylene-modified organopolysiloxane compound by the hydrosilylation of an unsaturated hydrocarbon group-containing polyoxyalkylene compound of general formula (7) below with a terminal silicon-bonded hydrogen atom-containing organopolysiloxane compound of general formula (6) below in the presence of a hydrosilylation catalyst, either within a solvent or in the absence of a solvent.

<Terminal Silicon-Bonded Hydrogen Atom-Containing Organopolysiloxane Compound>

[Chem. 17]

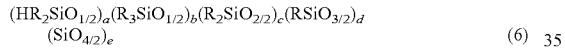

(6)

(wherein R, a, b, c, d and e are as defined above)
<Unsaturated Hydrocarbon Group-Containing Polyoxyalkylene Compound>

[Chem. 18]

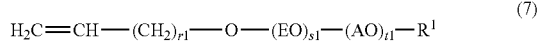

(7)

(wherein EO, AO, R', r1, s1 and t1 are as defined above)

In the terminal silicon-bonded hydrogen atom-containing organopolysiloxane compound, even in cases where two or more types of terminal silicon-bonded hydrogen atom-containing organopolysiloxane compounds are mixed together, the average structural formula should satisfy the range specified in formula (6) above.

It is possible to include not only [HR$_2$SiO$_{1/2}$] units, [R$_3$SiO$_{1/2}$] units and [R$_2$SiO$_{2/2}$] units, but also [RSiO$_{3/2}$] units and [SiO$_{4/2}$] units within molecules of the terminal silicon-bonded hydrogen atom-containing organopolysiloxane compound of formula (6). By including [RSiO$_{3/2}$] units and [SiO$_{4/2}$] units, there is a possibility that the wear resistance of a film of a resin composition containing the inventive organopolysiloxane emulsion composition which includes the resulting polyoxyalkylene-modified organopolysiloxane compound (A) will be improved.

Among terminal silicon-bonded hydrogen atom-containing organopolysiloxane compounds of formula (6), a linear organopolysiloxane compound which has silicon-bonded hydrogen atoms at both ends of general formula (8) below is preferred.

[Chem. 19]

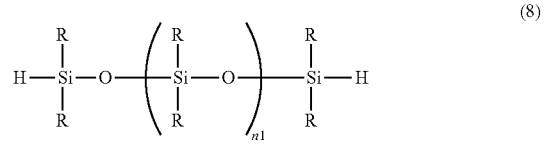

(8)

In this formula, R and n1 are as defined above.

The linear organopolysiloxane compound which has silicon-bonded hydrogen atoms at both ends of formula (8) is exemplified by, but not limited to, those of the following formulas.

[Chem. 20]

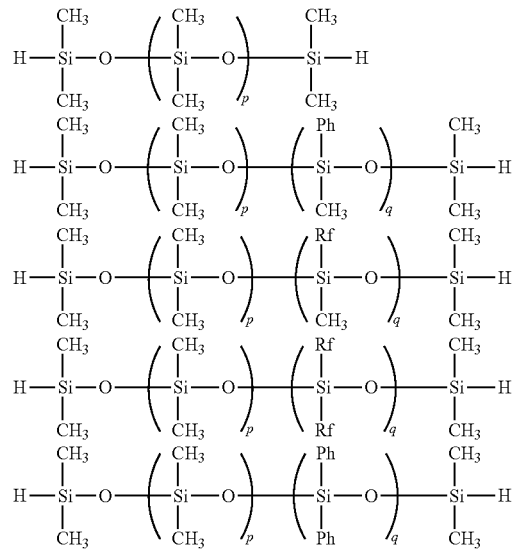

In these formulas, Ph stands for a phenyl group, Rf stands for a trifluoropropyl group, and the subscripts p and q are each integers of 0 or more, with the sum p+q being from 100 to 1,000. The siloxane units enclosed in parentheses may be randomly bonded.

In the unsaturated hydrocarbon group-containing polyoxyalkylene compound, it is also possible to use in admixture two or more types of unsaturated hydrocarbon group-containing polyoxyalkylene compounds. When two or more types of unsaturated hydrocarbon group-containing polyoxyalkylene compounds are mixed together, the average structural formula of the mixed compounds should satisfy the above-mentioned range of general formula (7).

The unsaturated hydrocarbon group-containing polyoxyalkylene compound of formula (7) is exemplified by, but not limited to, those of the following formulas.

[Chem. 21]

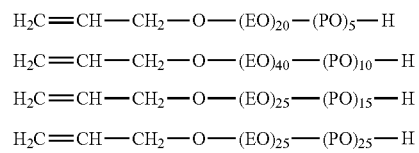

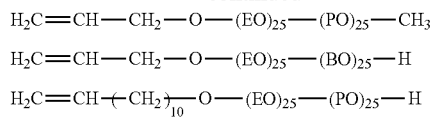

In these formulas, EO stands for ethylene oxide, PO stands for propylene oxide, and BO stands for butylene oxide. EO, PO and BO may be in random or block arrangements.

The number of moles of unsaturated hydrocarbon groups on the unsaturated hydrocarbon group-containing polyoxyalkylene compound of formula (7) is preferably at least 0.7 equivalent and up to 2.0 equivalents, and more preferably at least 1.0 equivalent and up to 2.0 equivalents, with respect to the number of moles of silicon-bonded hydrogen atoms on the terminal silicon-bonded hydrogen atom-containing organopolysiloxane compound of formula (6). At less than 0.7 equivalent, the hydrophilicity of the polyoxyalkylene-modified organopolysiloxane compound (A) decreases and there is a possibility that the compound will not function as an emulsifying agent or a co-emulsifying agent. At more than 2.0 equivalents, during preparation of the polyoxyalkylene-modified organopolysiloxane compound (A), a large amount of unsaturated hydrocarbon group-containing polyoxyalkylene compound of formula (7) that is unreacted is present, which may affect the emulsifiability and other properties of the polyoxyalkylene-modified to organopolysiloxane compound (A). In cases where the number of moles of silicon-bonded hydrogen atoms in formula (6) is larger than the number of moles of unsaturated hydrocarbon groups in formula (7) and hydrogen atoms remain present following the hydrosilylation reaction, the amount of remaining silicon-bonded hydrogen atoms can be lowered by adding an olefin such as hexene or heptene and further carrying out hydrosilylation.

The hydrosilylation catalyst used in hydrosilylation is a catalyst for accelerating the hydrosilylation reaction. Exemplary catalysts include platinum catalysts, rhodium catalysts and palladium catalysts, with platinum catalysts being preferred. Examples of platinum catalysts include chloroplatinic acid, alcohol-modified chloroplatinic acid, olefin complexes of platinum, ketone complexes of platinum, vinylsiloxane complexes of platinum, platinum tetrachloride, finely powdered platinum, solid platinum loaded on an alumina or silica support, platinum black, olefin complexes of platinum, alkenylsiloxane complexes of platinum and carbonyl complexes of platinum. From the standpoints of stability and versatility, chloroplatinic acid or a vinylsiloxane complex of platinum is preferred.

The catalyst content is not particularly limited so long as it is an effective amount, although the content is preferably such that the weight of catalyst metal is preferably in the range of 0.1 to 1,000 ppm, and more preferably in the range of 0.5 to 100 ppm, with respect to the combined weight of the terminal silicon-bonded hydrogen atom-containing organopolysiloxane compound and the unsaturated hydrocarbon group-containing polyoxyalkylene compound.

The solvent used in the hydrosilylation reaction is exemplified by aromatic hydrocarbon solvents such as toluene and xylene, hydrocarbon solvents such as hexane and octane, ether solvents such as dibutyl ether, dioxane and tetrahydrofuran (THF), ester solvents such as ethyl acetate and butyl acetate, ketone solvents such as methyl ethyl ketone (MEK), alcohol solvents such as ethanol, isopropanol and 1-butanol, and organic solvents such as chlorinated hydrocarbon solvents.

The solvent content is from 0 to 1,000 parts by weight per 100 parts by weight of the combined amount of the terminal silicon-bonded hydrogen atom-containing organopolysiloxane compound and the unsaturated hydrocarbon group-containing polyoxyalkylene compound. When a solvent is used, the solvent content is preferably at least 30 parts by weight. At a low solvent content, the hydrosilylation reaction may proceed slowly. On the other hand, at a high solvent content, solvent waste increases, which may cause environmental contamination.

In cases where an alcohol solvent is used, it is preferable to use a pH adjustor such as potassium acetate in order to prevent or suppress the dehydrogenation reaction (JP-B S62-34039).

It is desirable for the reaction temperature of hydrosilylation to be in the range of 50 to 150° C. At a reaction temperature lower than 50° C., the reaction rate may decline. At a reaction temperature higher than 150° C., unsaturated hydrocarbons internally migrate and the hydrosilylation reaction may not proceed. The reaction time is preferably from 2 to 15 hours.

The hydrosilylation reaction used for preparing the polyoxyalkylene-modified organopolysiloxane compound (A) is described in detail. In a nitrogen atmosphere, a terminal silicon-bonded hydrogen atom-containing organopolysiloxane compound, an unsaturated hydrocarbon group-containing polyoxyalkylene compound and isopropyl alcohol as the solvent are heated, bringing the internal temperature to 75° C. Next, a toluene solution of a vinylsiloxane complex of platinum is added and the system is stirred for 8 hours, thereby synthesizing the polyoxyalkylene-modified organopolysiloxane compound (A).

In addition, by heating and reducing the pressure, the isopropyl alcohol solvent can be driven off. At this time, because the alkyl ether sites may oxidize at temperatures above 120° C., it is desirable to carry out the reaction at or below 120° C.

Also, in this method, following hydrosilylation, deodorization by removing allyl ether groups with an acidic substance or by alkylation via a hydrogenation reaction may be carried out. Tocopherol and dibutylhydroxytoluene (BHT) may be added as antioxidants to the polyoxyalkylene-modified organopolysiloxane compound (A) thus obtained.

There are cases in which the polyoxyalkylene-modified organopolysiloxane compound (A), depending on the structure, takes the form of a paste, gel or solid and does not have flowability. When preparing a polyoxyalkylene-modified organopolysiloxane compound (A) which does not have flowability, preparation is carried out within an organic solvent because the hydrosilylation reaction proceeds efficiently.

Also, when the polyoxyalkylene-modified organopolysiloxane compound (A) is in the form of a paste, gel or solid that lacks flowability, it may not effectively disperse during emulsification, sometimes making it impossible to emulsify the organopolysiloxane (D). In cases where the polyoxyalkylene-modified organopolysiloxane compound (A) lacks flowability, use is made of an organic solvent solution of the polyoxyalkylene-modified organopolysiloxane compound (A) or of a polyoxyalkylene-modified organosiloxane compound (B) and/or nonionic surfactant (C-1)-solubilized solution of the polyoxyalkylene-modified organopolysiloxane compound (A).

An organic solvent that dissolves component (A) should be used in the organic solvent solution of the polyoxyalkylene-modified organopolysiloxane compound (A). The organic solvent used in preparing component (A) may be used directly for this purpose.

The polyoxyalkylene-modified organosiloxane compound (B)-solubilized solution of the polyoxyalkylene-modified organopolysiloxane compound (A), the nonionic surfactant (C-1)-solubilized solution of the polyoxyalkylene-modified organopolysiloxane compound (A), or the polyoxyalkylene-modified organosiloxane compound (B) and nonionic surfactant (C-1)-solubilized solution of the polyoxyalkylene-modified organopolysiloxane compound (A) can be prepared by adding the subsequently described polyoxyalkylene-modified organosiloxane compound (B) and/or nonionic surfactant (C-1) to an organic solvent solution of the polyoxyalkylene-modified organopolysiloxane compound (A), and then removing the organic solvent by heating and applying reduced pressure.

Here, when a polyoxyalkylene-modified organosiloxane compound (B) and nonionic surfactant (C-1)-solubilized solution of the polyoxyalkylene-modified organopolysiloxane compound (A) is to be prepared, in cases where the polyoxyalkylene-modified organosiloxane compound (B) is added to an organic solvent solution of the polyoxyalkylene-modified organopolysiloxane compound (A), the organic solvent is removed and the nonionic surfactant (C-1) is then added, cases where the nonionic surfactant (C-1) is added to an organic solvent solution of the polyoxyalkylene-modified organopolysiloxane compound (A), the organic solvent is removed and the polyoxyalkylene-modified organosiloxane compound (B) is then added, and cases where the polyoxyalkylene-modified organosiloxane compound (B) and the nonionic surfactant (C-1) are added to an organic solvent solution of the polyoxyalkylene-modified organopolysiloxane compound (A) and the organic solvent is then removed, the viscosity and other properties of the polyoxyalkylene-modified organosiloxane compound (B) and nonionic surfactant (C-1)-solubilized solution of the polyoxyalkylene-modified organopolysiloxane compound (A) may vary.

If the viscosity and other properties of a solubilized solution of components (A), (B) and (C-1) varies, this will affect the size of the emulsion particles when component (D) is emulsified. Moreover, when a solubilized solution of components (A), (B) and (C) is prepared, there is a possibility that the handleability will vary. One solution is to decide on the recipe used for preparation and to always employ the same method. For example, if one chooses a method of preparation that involves mixing together components (A) and (B), removing the organic solvent and then adding component (C-1), by always employing this method to carry out preparation, product having a similar viscosity can be obtained.

When a solution of the polyoxyalkylene-modified organopolysiloxane compound (A) is rendered into a polyoxyalkylene-modified organosiloxane compound (B) and/or nonionic surfactant (C-1)-solubilized solution, in order to drive off solely the organic solvent without driving off the polyoxyalkylene-modified organosiloxane compound (B) and the nonionic surfactant (C-1), it is necessary to select a polyoxyalkylene-modified organosiloxane compound (B) and a nonionic surfactant (C-1) which have lower vapor pressures than the organic solvent.

The method of preparing a polyoxyalkylene-modified organosiloxane compound (B) and/or nonionic surfactant (C-1)-solubilized solution of the polyoxyalkylene-modified organopolysiloxane compound (A) is as follows. The subsequently described polyoxyalkylene-modified organosiloxane compound (B) and/or nonionic surfactant (C-1) are added to an organic solvent solution of the polyoxyalkylene-modified organopolysiloxane compound (A), the pressure is reduced to from 3 to 50 mmHg and heating at between room temperature (20° C.) and 120° C. is carried out, thereby driving off the organic solvent and displacing it with the polyoxyalkylene-modified organosiloxane compound (B) and/or nonionic surfactant (C-1). The heating temperature at this time is preferably less than 120° C. At a temperature higher than 120° C., the alkyl ether sites may oxidize. In cases where foaming arises when the organic solvent is driven off, it is also possible to add a defoamer.

[(B) Polyoxyalkylene-Modified Organosiloxane Compound]

Component (B) is a polyoxyalkylene-modified organosiloxane compound of general formula (3) below.

[Chem. 22]

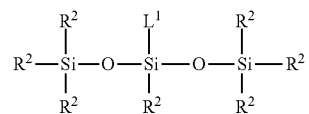 (3)

In this formula, $L^1$ is a monovalent organic group of general formula (4) below

[Chem. 23]

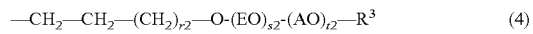 (4)

(wherein EO is an oxyethylene group, AO is a linear or branched oxyalkylene group of 3 to 10 carbon atoms, $R^3$ is a linear or branched, substituted or unsubstituted alkyl group of 1 to 10 carbon atoms, a hydrogen atom, a carboxyl group, an acyl group of 2 to 10 carbon atoms or a phenyl group, r2 is an integer from 0 to 10, s2 is an integer from 1 to 15, t2 is an integer from 0 to 15, and the sum s2+t2 is from 3 to 20); and each $R^2$, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms.

By adding the polyoxyalkylene-modified organosiloxane compound serving as component (B) to the organopolysiloxane emulsion composition, the gloss and leveling ability of a film of a resin composition formulated with the inventive organopolysiloxane emulsion composition are improved. Also, when the organopolysiloxane emulsion composition is dispersed in water, the dilution stability improves and undesirable effects such as separation out of the organopolysiloxane and formation of an interference film on the water surface are less likely to occur.

In formula (3), each $R^2$, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms. Examples of the linear or branched, substituted or unsubstituted alkyl group of 1 to 20 carbon atoms include alkyl groups such as methyl, ethyl, propyl, isopropyl, butyl, isobutyl, tert-butyl, pentyl, neopentyl, hexyl and octyl groups; and halogenated alkyl groups such as chloromethyl, chloropropyl, bromoethyl and trifluoropropyl groups. Examples of aryl groups of 6 to 20 carbon atoms include phenyl, tolyl, xylyl and naphthyl groups. Examples of aralkyl groups of 7 to 20 carbon atoms include benzyl, phenylethyl and phenylpropyl groups. Examples of alkoxy groups of 1 to 20 carbon atoms include methoxy, ethoxy and propoxy groups. $R^2$ is preferably a linear or branched, substituted or unsubstituted alkyl group of 1 to 20 carbon atoms or aryl group of 6 to 20 carbon atoms. From the standpoint of versatility, a methyl group or a phenyl group is more preferred.

$L^1$ is a monovalent organic group of above formula (4).

In formula (4), $R^3$ is a linear or branched, substituted or unsubstituted alkyl group of 1 to 10 carbon atoms, a hydrogen atom, a carboxyl group, an acyl group of 2 to 10 carbon atoms, or a phenyl group. Examples of linear or branched, substituted or unsubstituted alkyl groups of 1 to 10 carbon atoms include alkyl groups such as methyl, ethyl, propyl, isopropyl, butyl, isobutyl, tert-butyl, pentyl, neopentyl, hexyl and octyl groups; and halogen-substituted alkyl groups such as chloromethyl, chloropropyl, bromoethyl and trifluoropropyl groups. Examples of acyl groups of 2 to 10 carbon atoms include acetyl and octanoyl groups. $R^3$ is preferably a linear or branched, substituted or unsubstituted alkyl group of 1 to 10 carbon atoms, or a hydrogen atom. For ease of synthesis, a hydrogen atom is more preferred.

EO is an oxyethylene group, and AO is a linear or branched oxyalkylene group of 3 to 10 carbon atoms. Examples of AO include oxypropylene, oxybutylene and oxytetramethylene groups.

Also, the subscript r2 is an integer from 0 to 10, the subscript s2 is an integer from 1 to 15 and the subscript t2 is an integer from 0 to 15, with the sum s2+t2 being from 3 to 20. Preferably, s2 is an integer from 1 to 10 and t2 is an integer from 0 to 10. More preferably, s2 is an integer from 3 to 10, and t2 is an integer from 3 to 10. When s2 is larger than 15 and t2 is larger than 15, the leveling ability of a resin composition containing the inventive organopolysiloxane emulsion composition decreases. The sum s2+t2 in the average structural formula within the molecule is from 3 to 20, and preferably from 5 to 15. At less than 3, the gloss and leveling ability of a film of a resin composition formulated with the inventive organopolysiloxane emulsion composition decrease. At more than 20, the leveling ability of a film of the resin composition decreases.

EO and AO may be in a block or random arrangement. The subscript r2 should satisfy the above-indicated value, although from the standpoint of versatility, r2 is most preferably 1.

The polyoxyalkylene-modified organopolysiloxane compound of formula (3) has a hydrophilic-lipophilic balance (HLB) that is preferably at least 8, and more preferably at least 10 and up to 17. At a HLB below 8, the stability when a resin composition formulated with the inventive organopolysiloxane emulsion composition is diluted in water may decrease. The HLB value is determined by Griffin's method.

The polyoxyalkylene-modified organosiloxane compound (B) has a molecular weight of preferably from 500 to 5,000, more preferably from 600 to 3,000, and even more preferably from 600 to 1,000. At a molecular weight below 500, a film of a resin composition formulated with the polyoxyalkylene-modified organosiloxane compound (B)-containing organopolysiloxane emulsion composition may have a decreased gloss. On the other hand, at a molecular weight greater than 5,000, when a resin composition formulated with the polyoxyalkylene-modified organosiloxane compound (B)-containing organopolysiloxane emulsion composition is coated, the leveling ability may decrease.

The viscosity of the polyoxyalkylene-modified organosiloxane compound (B) is preferably less than 1,000 mPa·s, more preferably 200 mPa·s or less, and even more preferably 100 mPa·s or less. The lower limit is preferably at least 10 mPa·s. At a viscosity of 1,000 mPa·s or more, the leveling ability of a resin composition formulated with an organopolysiloxane emulsion composition which includes the polyoxyalkylene-modified organosiloxane compound of general formula (3) decreases and cissing may arise.

Component (B) may be a mixture of two or more different polyoxyalkylene-modified organosiloxane compounds, provided that the mixed compounds satisfy the ranges specified in general formula (3) above.

Examples of the polyoxyalkylene-modified organosiloxane compound of component (B) include, but are not limited to, those of the following formulas.

[Chem. 24]
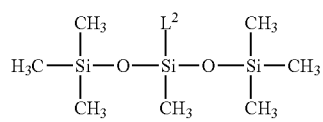
$L^2$: —CH$_2$CH$_2$CH$_2$O(EO)$_8$COCH$_3$

[Chem. 25]
$L^3$: —CH$_2$CH$_2$CH$_2$O(EO)$_8$H

[Chem. 26]
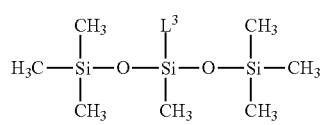
$L^4$: —CH$_2$CH$_2$CH$_2$O(EO)$_{10}$H

[Chem. 27]
$L^5$: —CH$_2$CH$_2$CH$_2$CH$_2$CH$_2$CH$_2$O(EO)$_{10}$(PO)$_2$H

[Chem. 28]
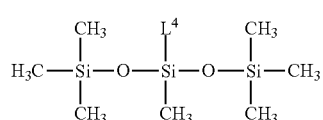
$L^6$: —CH$_2$CH$_2$CH$_2$O(EO)$_{10}$(PO)$_2$H

[Chem. 29]
$L^7$: —CH$_2$CH$_2$CH$_2$O(EO)$_{15}$(PO)$_2$H

[Chem. 30]
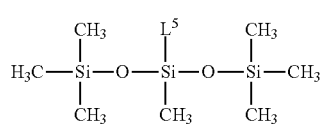
$L^8$: —CH$_2$CH$_2$CH$_2$O(EO)$_{10}$CH$_3$

In these formulas, Ph is a phenyl group, EO is ethylene oxide, and PO is propylene oxide. EO and AO may be in a block or random arrangement.

The polyoxyalkylene-modified organosiloxane compound (B) of general formula (3) may be prepared by a known method. Specifically, it may be prepared by the following method.

The polyoxyalkylene-modified organosiloxane compound is synthesized by a hydrosilylation reaction between a silicon-bonded hydrogen atom-containing organosiloxane compound of general formula (9) below and an unsaturated hydrocarbon group-containing polyoxyalkylene compound of general formula (10) below in the presence of a hydrosilylation reaction catalyst, either within a solvent or in the absence of a solvent.

<Silicon-Bonded Hydrogen Atom-Containing Organosiloxane Compound>

[Chem. 31]

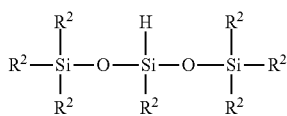

(9)

(wherein $R^2$ is as defined above)

<Unsaturated Hydrocarbon Group-Containing Polyoxyalkylene Compound>

[Chem. 32]

(10)

(wherein EO, AO, $R^3$, r2, s2, t2 and s2+t2 are as defined above)

In the hydrosilylation reaction, the number of moles of unsaturated hydrocarbon groups on the unsaturated hydrocarbon group-containing polyoxyalkylene compound of formula (10) per mole of silicon-bonded hydrogen atoms on the silicon-bonded hydrogen atom-containing organosiloxane compound of formula (9) is preferably at least 0.7 and up to 2.0, and more preferably at least 1.0 and up to 1.5.

The hydrosilylation catalyst and solvent used in the hydrosilylation reaction are exemplified in the same way as those mentioned above in connection with the method of preparing the polyoxyalkylene-modified organopolysiloxane compound (A), and the amounts thereof included may also be similarly set.

It is desirable for the reaction temperature of the hydrosilylation reaction to be in the range of 50 to 150° C. At a reaction temperature below 50° C., the reaction rate may decrease; at a reaction temperature above 150° C., internal rearrangement of the unsaturated hydrocarbon may occur and the hydrosilylation reaction may fail to proceed. The reaction time is preferably from 2 to 15 hours.

In addition, the solvent, etc. can be driven off by applying heat and reduced pressure.

[(C) Surfactant]

The surfactant serving as component (C) is exemplified by nonionic surfactants, anionic surfactants, cationic surfactants and amphoteric surfactants.

Exemplary nonionic surfactants include polyoxyethylene alkyl ether and other polyoxyalkylene alkyl ethers, polyoxyethylene polyoxypropylene alkyl ethers, polyoxyethylene alkyl phenyl ethers, polyoxyethylene fatty acid esters, sorbitan fatty acid esters, polyoxyethylene sorbitan fatty acid esters and glycerol fatty acid esters. Specific examples of these include polyoxyethylene octyl ether, polyoxyethylene polyoxypropylene octyl ether, polyoxyethylene nonyl ether, polyoxyethylene decyl ether, polyoxyethylene polyoxypropylene decyl ether, polyoxyethylene lauryl ether, polyoxyethylene polyoxypropylene lauryl ether, polyoxyethylene tridecyl ether, polyoxyethylene polyoxypropylene tridecyl ether and polyoxyethylene cetyl ether. The use of a reactive surfactant having a functional group is also possible.

Exemplary anionic surfactants include alkyl sulfates such as lauryl sulfate, alkylbenzenesulfonic acids and salts thereof, sulfuric acid esters of monoalkyl polyoxyethylene ethers, acetic acid salts of monoalkyl polyoxyethylene ethers, alkylnaphthylsulfonic acids and salts thereof, alkali metal sulforesinates, alkali metal sulfosuccinates, alkylphosphoric acids and salts thereof, phosphoric acid esters of monoalkyl polyoxyethylene ethers, sulfonated glyceryl esters of fatty acids, alkali metal salts of alkyl sulfates and sulfuric acid esters. Specific examples of these include lauryl sulfuric acid, sodium lauryl sulfate, triethanolamine lauryl sulfate, ammonium lauryl sulfate, sodium lauryl polyoxyethylene ether sulfate, sodium lauryl polyoxyethylene ether acetate, sodium dodecylbenzenesulfonate, disodium lauryl polyoxyethylene sulfosuccinate, sodium dioctyl sulfosuccinate, sodium lauryl polyoxyethylene ether phosphate and sodium alkylnaphthalenesulfonate. The use of a reactive surfactant having a functional group is also possible.

Exemplary cationic surfactants include alkylamines, quaternary ammonium salts, sulfonium salts, phosphonium salts and acetic acid salts. Specific examples include stearyl amine acetate, lauryltrimethylammonium chloride, cetyltrimethylammonium chloride, stearyltrimethylammonium chloride and alkylbenzyldimethylammonium chloride.

Exemplary amphoteric surfactants include alkyl betaines and alkyl imidazolines. Specific examples of these include lauryldimethylaminoacetic acid betaine, lauryldimethylamine oxide and 2-alkyl-N-carboxymethyl-N-hydroxyethylimidazolinium betaine.

In the case of anionic surfactants, cationic surfactants and amphoteric surfactants, sometimes the uses are limited because the molecule bears an electrical charge, and sometimes atoms such as sulfur or nitrogen included in the surfactant become catalyst poisons, hindering the reaction. In cases where the organopolysiloxane emulsion composition of the invention is formulated for uses in which the electrical charge of the surfactant or catalyst poisoning is a concern, use should be made of only nonionic surfactants. From the standpoint of emulsifiability, the nonionic surfactant is preferably a polyoxyalkylene alkyl ether or a polyoxyethylene sorbitan fatty acid ester.

[(C-1) Nonionic Surfactant]

The nonionic surfactant is described in detail. Nonionic surfactants suitable for use in the present invention are nonionic surfactants which are liquid at 25° C. and which are capable of solvating the polyoxyalkylene-modified organopolysiloxane compound (A). Examples include nonionic surfactants such as polyoxyethylene alkyl ether and other polyoxyalkylene alkyl ethers, polyoxyethylene polyoxypropylene alkyl ethers, polyoxyethylene alkyl phenyl ethers, polyoxyethylene fatty acid esters, sorbitan fatty acid esters, polyoxyethylene sorbitan fatty acid esters and glycerol fatty acid esters. Specific examples of these include polyoxyethylene octyl ether, polyoxyethylene polyoxypropylene octyl ether, polyoxyethylene nonyl ether, polyoxyethylene decyl ether, polyoxyethylene polyoxypropylene decyl ether, polyoxyethylene lauryl ether, polyoxyethylene polyoxypropylene lauryl ether, polyoxyethylene tridecyl ether, polyoxyethylene polyoxypropylene tridecyl ether and polyoxyethylene cetyl ether. Of these nonionic surfactants, from the standpoint of emulsifiability, a polyoxyalkylene alkyl ether or a polyoxyethylene sorbitan fatty acid ester is preferred. Of these, ones in which the number of added moles of ethylene oxide is from 2 to 15 are preferred; ones having a HLB is from 7.5 to 15 are especially preferred. The HLB is determined by Griffin's method. Two or more nonionic surfactants may be mixed and used together, in which case the HLB of the mixed surfactants should satisfy the above value.

[(D) Organopolysiloxane]

Component (D) is an organopolysiloxane of the average compositional formula (12) below which has a viscosity at 25° C. of at least 1,000,000 mPa·s. Component (D) does not include polyoxyalkylene-modified organopolysiloxanes.

$$R^4{}_f SiO_{(4-f)/2} \quad (12)$$

In this formula, each $R^4$, which may be the same or different, is a hydrogen atom, a hydroxyl group, a linear or branched, unsubstituted or halogen atom, hydroxyl group, amino group or aminoalkylamino group-substituted alkyl group of 1 to 20 carbon atoms, an alkenyl group of 2 to 20 carbon atoms, an aryl group of 6 to 20 carbon atoms or an aralkyl group of 7 to 20 carbon atoms; and f is a positive number from 1.8 to 2.2.

In formula (12), each $R^4$, which may be the same or different, is a hydrogen atom, a hydroxyl group, a linear or branched, unsubstituted or halogen atom, hydroxyl group, amino group or aminoalkylamino group-substituted alkyl group of 1 to 20 carbon atoms, an alkenyl group of 2 to 20 carbon atoms, an aryl group of 6 to 20 carbon atoms or an aralkyl group of 7 to 20 carbon atoms. Specific examples include a hydrogen atom; a hydroxyl group; saturated aliphatic hydrocarbon groups consisting of a linear or branched alkyl group of 1 to 20 carbon atoms, such as a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl or nonadecyl group; unsaturated aliphatic hydrocarbon groups consisting of an alkenyl group of 2 to 20 carbon atoms, such as a vinyl, propenyl or hexenyl group; aryl groups of 6 to 20 carbon atoms, such as phenyl, tolyl, xylyl and naphthyl groups; and aromatic hydrocarbon groups consisting of an aralkyl group of 7 to 20 carbon atoms, such as a benzyl, phenylethyl or phenylpropyl group. Additional examples include any of the above alkyl groups in which some or all hydrogen atoms are substituted with: fluorine, bromine, chlorine or other halogen atoms (e.g., the chloromethyl, chloropropyl, and trifluoropropyl groups); hydroxyl groups (e.g., the hydroxymethyl, hydroxyethyl, and hydroxypropyl groups); amino groups (e.g., the aminopropyl group); and aminoalkylamino groups (e.g., the aminoethylaminopropyl group). It is preferable for at least 70 mol % of all the $R^4$ groups to be methyl groups, and more preferable for at least 90 mol % of all the $R^4$ groups to be methyl groups. From the standpoint of versatility, methyl, phenyl and hydroxyl groups are preferred.

The organopolysiloxane has a viscosity at 25° C. of at least 1,000,000 mPa·s, preferably from 2,000,000 to 100,000,000 mPa·s, and more preferably from 5,000,000 to 100,000,000 mPa·s. At a viscosity lower than 1,000,000 mPa·s, the slickness and other properties decrease or the gloss of a film of the inventive organopolysiloxane emulsion composition-containing resin composition decreases. At a viscosity higher than 100,000,000 mPa·s, the strain on the equipment during emulsification becomes large or emulsification takes a long time.

Two or more different organopolysiloxanes may be mixed together and used as component (D), in which case the viscosity of the mixed organopolysiloxanes should satisfy the above range. The viscosity of the organopolysiloxane (D) is a value measured with a HAAKE MARS 40 rheometer (ThermoFisher Scientific) in the steady-state flow viscosity measurement mode.

In the organopolysiloxane emulsion composition of the invention, the content of the polyoxyalkylene-modified organopolysiloxane compound (A) per 100 parts by weight of the organopolysiloxane (D) is from 1 to 50 parts by weight, preferably from 5 to 40 parts by weight, and more preferably from 10 to 35 parts by weight. When the content of the polyoxyalkylene-modified organopolysiloxane compound (A) is less than 1 part by weight, owing to a decrease in emulsifiability, the organopolysiloxane (D) may not emulsify. Also, the solvent resistance and salt resistance of the organopolysiloxane emulsion composition may decrease. On the other hand, when the content of the polyoxyalkylene-modified organopolysiloxane compound (A) is greater than 50 parts by weight, the transparency of a film of the organopolysiloxane emulsion composition-containing resin composition may decrease.

In the organopolysiloxane emulsion composition of the invention, the content of the polyoxyalkylene-modified organosiloxane compound (B) per 100 parts by weight of the organopolysiloxane (D) is from 1 to 50 parts by weight, preferably from 5 to 40 parts by weight, and more preferably from 10 to 25 parts by weight. When the content of the polyoxyalkylene-modified organosiloxane compound (B) is less than 1 part by weight, the leveling ability of the inventive organopolysiloxane emulsion composition may decrease and the gloss when blended with a resin may decrease. On the other hand, when the content of the polyoxyalkylene-modified organosiloxane compound (B) is more than 50 parts by weight, there is a concern that it may become difficult to reduce the particle size of the organopolysiloxane emulsion composition.

In the organopolysiloxane emulsion composition of the invention, the content of the surfactant (C) per 10 parts by weight of the organopolysiloxane (D) is from 0 to 50 parts by weight, preferably from 3 to 40 parts by weight, and more preferably from 5 to 35 parts by weight. In cases where the organopolysiloxane (D) can be emulsified with only the polyoxyalkylene-modified organopolysiloxane compound (A) and the polyoxyalkylene-modified organosiloxane compound (B), a surfactant (C) need not be included. At a surfactant (C) content greater than 50 parts by weight, the wear resistance of a film of the inventive resin composition may be adversely affected.

When a surfactant (C) is used, although the weight ratio between the polyoxyalkylene-modified organopolysiloxane compound (A) and the surfactant (C) is not specified, it is desirable for the weight ratio (polyoxyalkylene-modified organopolysiloxane compound (A)/surfactant (C)) to be at least 0.1, preferably from 0.2 to 10, and more preferably from 0.5 to 5.

The weight ratio between the polyoxyalkylene-modified organopolysiloxane compound (A) and the polyoxyalkylene-modified organosiloxane compound (B) also is not particularly specified, although it is desirable for the weight ratio (polyoxyalkylene-modified organopolysiloxane compound (A)/polyoxyalkylene-modified organosiloxane compound (B)) to be at least 0.1, preferably from 0.2 to 10, and more preferably from 0.5 to 5.

In addition, although the combined amount of the polyoxyalkylene-modified organopolysiloxane compound (A), the polyoxyalkylene-modified organosiloxane compound (B) and the surfactant (C) per 100 parts by weight of the organopolysiloxane (D) is not particularly limited, this is typically from 5 to 100 parts by weight, preferably from 10 to 75 parts by weight, and more preferably from 35 to 75 parts by weight. When the combined amount of the polyoxyalkylene-modified organopolysiloxane compound (A), the polyoxyalkylene-modified organosiloxane compound (B) and the surfactant (C) per 100 parts by weight of the organopolysiloxane (D) is less than 5 parts by weight, there is a possibility that the organopolysiloxane (D) cannot be emulsified or that the organopolysiloxane emulsion composition will not be stable. On the other hand, when the combined amount exceeds 100 parts by weight, the wear resistance of a film of resin composition formulated with the organopolysiloxane emulsion composition may decrease.

[(E) Water]

In the organopolysiloxane emulsion composition of the invention, water (E) should be included where necessary from the standpoint of such considerations as the required form or emulsifiability (e.g., self-emulsifying type, emulsion type) of the product. Therefore, the water (E) content, based on an organopolysiloxane (D) content of 100 parts by weight, is from 0 to 10,000 parts by weight, preferably from 0 to 5,000 parts by weight, and more preferably from 0 to 1,000 parts by weight. When water (E) is included, the amount of water per 100 parts by weight of the organopolysiloxane (D) is preferably at least 10 parts by weight. At more than 10,000 parts by weight, the stability may decrease and separation may become large. At a water (E) content within the above range, the particle size does not change over time.

When emulsification of the organopolysiloxane (D) is possible with the polyoxyalkylene-modified organopolysiloxane compound (A), the polyoxyalkylene-modified organosiloxane compound (B) and the surfactant (C), there is no need to include water (E).

That is, in the organopolysiloxane emulsion composition of the invention, in cases where component (E) water is not included, component (D) disperses and emulsifies in components (A), (B) and (C). In cases where component (E) water is included, component (D) disperses and emulsifies in components (E), (A), (B) and (C).

[Preparation of Composition]

Specific methods for emulsifying the organopolysiloxane emulsion composition of the invention are chiefly as indicated below.

A first method emulsifies a mixture of (A) the polyoxyalkylene-modified organopolysiloxane compound, (B) the polyoxyalkylene-modified organosiloxane compound, (C) the surfactant and (D) the organopolysiloxane, and then blends in (E) water.

A second method emulsifies a mixture of (A) the polyoxyalkylene-modified organopolysiloxane compound, (B) the polyoxyalkylene-modified organosiloxane compound, (C) the surfactant, (D) the organopolysiloxane and (E) water.

A third method emulsifies a mixture of (B) the polyoxyalkylene-modified organosiloxane compound, (C) the surfactant, (D) the organopolysiloxane and (E) water, and then blends in (A) the polyoxyalkylene-modified organopolysiloxane compound.

A fourth method emulsifies a mixture of (A) the polyoxyalkylene-modified organopolysiloxane compound, (B) the polyoxyalkylene-modified organosiloxane compound, (D) the organopolysiloxane and (E) water, and then blends in (C) the surfactant.

A fifth method emulsifies a mixture of (A) the polyoxyalkylene-modified organopolysiloxane compound, (B) the polyoxyalkylene-modified organosiloxane compound and (D) the organopolysiloxane, and then blends in (C) the surfactant and (E) water.

A sixth method emulsifies a mixture of (A) the polyoxyalkylene-modified organopolysiloxane compound, (C) the surfactant, (D) the organopolysiloxane and (E) water, and then blends in (B) the polyoxyalkylene-modified organosiloxane compound.

The emulsification methods of the invention are described in detail below.

The first emulsification method is as follows. A mixture of (A) the polyoxyalkylene-modified organopolysiloxane compound, (B) the polyoxyalkylene-modified organosiloxane compound, (C) the surfactant and (D) the organopolysiloxane is emulsified using a planetary mixer, which is a two- or three-blade mixer that operates based on orbital revolution and own-axis rotation. After 2 to 180 minutes of agitation until a given particle size is achieved, water (E) is added and dilution is carried out with a planetary mixer, a dispersion mixer (a mixer based on the rotation of toothed blades) or a homogenizing mixer (a mixer based on the spinning of a rotor within a stator), thereby preparing the organopolysiloxane emulsion composition.

The second emulsification method is as follows. A mixture of (A) the polyoxyalkylene-modified organopolysiloxane compound, (B) the polyoxyalkylene-modified organosiloxane compound, (C) the surfactant, (D) the organopolysiloxane and (E) water is emulsified with a planetary mixer. Agitation is carried out for 2 to 180 minutes until a given particle size is achieved, thereby preparing the organopolysiloxane emulsion composition.

The third emulsification method is as follows. A mixture of (B) the polyoxyalkylene-modified organosiloxane compound, (C) the surfactant, (D) the organopolysiloxane and (E) water is emulsified with a planetary mixer or dispersion mixer. After 2 to 180 minutes of agitation until a given particle size is achieved, (A) the polyoxyalkylene-modified organopolysiloxane compound (A) is blended in and mixing is carried out with a planetary mixer, a dispersion mixer or a homogenizing mixer, thereby preparing the organopolysiloxane emulsion composition.

The fourth emulsification method is as follows. A mixture of (A) the polyoxyalkylene-modified organopolysiloxane compound, (B) the polyoxyalkylene-modified organosiloxane compound, (D) the organopolysiloxane and (E) water is emulsified with a planetary mixer or a dispersion mixer. After 2 to 180 minutes of agitation until a given particle size is achieved, the surfactant (C) is added and dilution is carried out with a planetary mixer, a dispersion mixer or a homogenizing mixer, thereby preparing the organopolysiloxane emulsion composition.

The fifth emulsification method is as follows. A mixture of (A) the polyoxyalkylene-modified organopolysiloxane compound, (B) the polyoxyalkylene-modified organosiloxane compound and (D) the organopolysiloxane is emulsified with a planetary mixer or a dispersion mixer. After 2 to 180 minutes of agitation until a given particle size is achieved, (C) the surfactant and (E) water are added and dilution is carried out with a planetary mixer, a dispersion mixer or a homogenizing mixer, thereby preparing the organopolysiloxane emulsion composition.

The sixth emulsification method is as follows. A mixture of (A) the polyoxyalkylene-modified organopolysiloxane compound, (C) the surfactant, (D) the organopolysiloxane and (E) water is emulsified with a planetary mixer or dispersion mixer. After 2 to 180 minutes of agitation until a given particle size is achieved, (B) the polyoxyalkylene-modified organosiloxane compound is added and dilution is carried out with a planetary mixer, a dispersion mixer or a homogenizing mixer, thereby preparing the organopolysiloxane emulsion composition.

In the above emulsification methods, component (A) and component (B) and/or component (C) can also be used as a polyoxyalkylene-modified organosiloxane compound (B) and/or surfactant (C)-solubilized solution of the polyoxyalkylene-modified organopolysiloxane compound (A).

It is possible to prepare the organopolysiloxane emulsion composition of the invention even without using the surfactant (C) and water (E). In cases where the organopolysiloxane emulsion composition is blended into a resin dispersed in a nonpolar solvent, because there is a possibility of the water (E) becoming inhomogeneous and separating out, it is preferable that water (E) not be included in the organopolysiloxane emulsion composition of the invention.

The organopolysiloxane (D) concentration in the organopolysiloxane emulsion composition of the invention is preferably in the range of 1 to 90 wt %. At less than 1 wt %, the stability of the emulsion composition is poor; at more than 90 wt %, the emulsion composition has a high viscosity, making it difficult to handle. Also, depending on the makeup of the organopolysiloxane emulsion composition, separation may occur over time. In such cases, separation can sometimes be suppressed by reducing the content of the water (E) included in the organopolysiloxane emulsion composition.

The temperature during emulsification is preferably from 0 to 80° C., and more preferably from 0 to 60° C. At a temperature below 0° C. or a temperature higher than 80° C., there is a possibility that emulsion will not take place or that the emulsion produced will be unstable. Emulsification may be carried out not only at normal pressure, but even at reduced pressure or under applied pressure. When emulsion is carried out at reduced pressure or under applied pressure, bubbles are less likely to be entrained and effective emulsification is sometimes possible. To avoid vaporization of the starting materials, care should be taken to ensure that the pressure during pressure reduction is higher than the vapor pressure of the starting materials. The emulsification time, although not particularly specified, is preferably from 2 to 600 minutes, and more preferably from 2 to 360 minutes, at the moment when the emulsion attains the target particle size.

With regard to the emulsifier used during emulsification, it is necessary to select one which is capable of agitating the starting materials or the emulsion composition. Effective emulsification is possible by using, as a planetary mixer—which is a two- or three-blade mixer that operates based on orbital revolution and own-axis rotation, any of the following: the Gate Mixer (Inoue Manufacturing, Inc.), the Hivis Mix® (Primix Corporation), or the Hivis Disper Mix model 3D-5 (Primix Corporation), which is an agitator based on the orbital revolution and own-axis rotation of two blades and the high-speed rotation of a toothed blade. Alternatively, use can be made of a colloid mill having an agitating mechanism consisting of a rotor and a stator (such as those available from IKA, PUC, Nissei Corporation and Iwaki Co., Ltd.), and high-shear mixers (such as those available from Silverson and Primix Corporation). Use can also be made of the Homogenizing Disper (Primix Corporation), the Agi Homo Mixer (Primix Corporation), the Combi Mix® (Primix Corporation)—which is a three-shaft dispersion mixer that combines the Homogenizing Mixer, the Homogenizing Disper and the Anchor Mixer, the twin-screw mixer HAAKE MiniLab II (Thermo Scientific)—which has co-rotating screws or counter-rotating screws, and the MC 15 and MC 5 (Rheo Lab Ltd.). In cases where the three-shaft dispersion mixer Combi Mix® (Primix Corporation) or the Hivis Disper Mix (Primix Corporation) is used, emulsification with the Anchor Mixer alone is also possible.

Aside from the surfactant, the organopolysiloxane emulsion composition of the invention may also be formulated with, as a protective colloid or a thickener, a water-soluble polymer such as polyvinyl alcohol, methylcellulose, carboxymethylcellulose, hydroxymethylcellulose, polyvinylpyrrolidone, alginic acid salt, xanthan gum or an acrylic acid polymer, within ranges that do not detract from the objects of the invention. In addition, antibacterial agents or preservatives such as oxazoline compounds and aromatic carboxylic acid salts, as well as fragrances, antioxidants, corrosion inhibitors, dyes, fillers, curing catalysts, organic powders and inorganic powders may be included.

The average particle size of an emulsion of the inventive organopolysiloxane emulsion composition is not specified, but is preferably not more than 20 µm, and more preferably not more than 15 µm. At an average particle size larger than 20 µm, in cases where the organopolysiloxane emulsion composition has been dispersed in water or a solvent such as dimethylformamide, separation sometimes occurs immediately. In the organopolysiloxane emulsion composition of the invention, when the average particle size of the emulsion is 1.5 µm or more, it can be measured using the Multisizer 3 from Beckman Coulter. When the emulsion has an average particle size of less than 1.5 µm, measurement can be carried out with the LA920 or LA960 from Horiba, Ltd. or with the N4 PLUS from Beckman Coulter. The average particle size is measured after diluting the organopolysiloxane emulsion composition in water at the time of measurement. The average particle size, although it has no particular lower limit, is typically at least 0.1 µm, and preferably at least 0.5 µm.

[Resin Composition]

The organopolysiloxane emulsion composition of the invention may be used as a surface treatment agent or an internally added treatment agent for synthetic leather and artificial leather. By blending the organopolysiloxane emulsion composition into a resin composition containing a resin such as an acrylic resin or urethane resin and a solvent that disperses the resin, good slickness can be imparted.

Examples of the resin used in this resin composition include thermoset resins such as urethane resins, epoxy resins, phenolic resins, melamine resins, urea resins, alkyd resins and polyimide resins; and thermoplastic resins such as polyethylene, polypropylene, polyvinyl chloride, polystyrene, polyvinyl acetate, polytetrafluoroethylene, acrylonitrile-butadiene-styrene resins, acrylonitrile-styrene resins and acrylic resins. From the standpoint of versatility, a urethane resin or an acrylic resin is preferred.

Examples of the solvent that disperses the resin include water, and organic solvents such as DMF, toluene, xylene, ethylbenzene, mineral spirits, methyl isobutyl ketone, ethyl acetate, butyl acetate, isobutyl acetate, isopropanol, butanol and diethylene glycol monobutyl ether.

The resin is used after dispersion in a solvent or the like. The method of dispersion in a solvent is not particularly specified, although an exemplary method is one which, by synthesizing the resin (such as an acrylic resin) within the above-mentioned solvent, disperses the resin in the solvent.

When blending the organopolysiloxane emulsion composition into a resin composition containing a resin and a solvent that disperses the resin, the organopolysiloxane emulsion composition may be blended directly into the resin composition and uniformly dispersed, or the organopolysiloxane emulsion composition may first be dispersed in water or an organic solvent such as DMF or MEK and then blended into the resin composition. To uniformly mix the organopolysiloxane emulsion composition into the resin composition, use can be made of a known mixer, such as a homogenizing mixer, a Satake mixer, a static mixer, a Ross mixer, a Hobart mixer, a Henschel mixer, a paddle mixer or a ribbon mixer.

The content of the organopolysiloxane emulsion composition in the resin composition is such that the level of active ingredients (solids) in the emulsion composition relative to the resin solids is from 0.01 to 30 wt %, preferably from 0.1 to 20 wt %, and more preferably from 0.2 to 10 wt %. At a content below 0.01 wt %, slickness sometimes cannot be obtained. At a content of more than 30 wt %, the gloss and the leveling ability sometimes decrease.

Film-forming methods in which the resin composition of the invention is applied as a surface treatment agent to the surface of artificial leather or synthetic leather are exemplified by spraying methods that involve direct spraying, and direct coating methods with a gravure coater, a knife coater, a comma coater or an air-knife coater. From the standpoint of versatility and the stability of the resin composition, a direct coating method using a gravure coater is most preferred. With regard to the coating weight, the weight of the applied film after drying is preferably in the range of 3 to 100 g/m$^2$, and more preferably in the range of 5 to 30 g/m$^2$. At a film weight below 3 g/m$^2$ or above 100 g/m$^2$, a uniform resin layer does not readily form and unevenness in the gloss and the leveling ability may arise.

The drying conditions following application of the resin composition of the invention are not particularly limited, provided that the water or organic solvent within the resin composition evaporates and, where necessary, resin crosslinking reactions arise. Generally, heating at from 20 to 150° C. for a period of from about 10 seconds to about 5 minutes is preferred, and heating at from 80 to 130° C. for a period of from about 30 seconds to about 2 minutes is more preferred.

Methods for producing artificial leather in which the resin composition of the invention is included as an internally added treatment agent are exemplified as follows. The artificial leather is produced by applying the resin composition of the invention and various types of polymer compounds to, as the artificial leather starting material, a nonwoven sheet composed primarily of ultrafine fibers, and then heating, drying and the like. Application to the nonwoven sheet may be carried out by any suitable method, such as impregnation, spraying or coating. The heating and drying method is exemplified by hot air drying, infrared heating and radio-frequency heating. Taking into account equipment investment costs, ease of maintenance and other considerations, hot-air dryers are commonly used. The drying temperature is from 20 to 150° C. With heating at elevated temperatures above 150° C., the heat resistance of the resins may decrease and fiber deterioration may arise.

In this invention, by including polyoxyalkylene-modified organo(poly)siloxane compounds of specific structures (above components (A) and (B)) as emulsifying agents or co-emulsifying agents, a highly polymerized organopolysiloxane can be emulsified, thus making it possible to stably blend this organopolysiloxane emulsion composition in both solvent-based resin compositions (which use organic solvents) and water-based resin compositions. Moreover, a film obtained with the resin composition imparts good slickness without giving rise to cissing or blushing. Accordingly, the resin composition of the invention is useful as a surface treatment agent or an internally added treatment agent for synthetic leather and artificial leather intended for use in automobile seats, bags and the like.

EXAMPLES

The invention is illustrated more fully below by way of Examples and Comparative Examples. However, the invention is not limited by these Examples. In the Examples below, viscosity is a value measured at 25° C. using a BM- or BH-type rotational viscometer, or an Ostwald viscometer. Also, the weight-average molecular weight is the polystyrene-equivalent weight-average molecular weight obtained by gel permeation chromatography (GPC) with the HLC 8220 system from Tosoh Corporation and using tetrahydrofuran (THF) as the solvent.

Example 1

Under a nitrogen atmosphere, 79 parts by weight (79 g) of a silicon-bonded hydrogen atom-containing organopolysiloxane of general formula (8a) below

[Chem. 33]

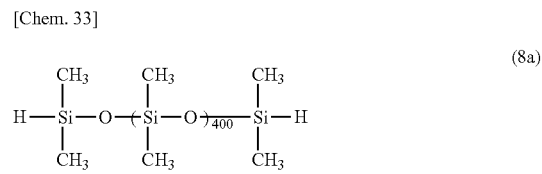

(8a)

(viscosity, 2,800 mm$^2$/s; amount of hydrogen atoms bonded to silicon atoms, 0.00625 mol/100 g), 21 parts by weight (21 g) of an unsaturated group-containing polyoxyalkylene compound of general formula (7a) below

[Chem. 34]

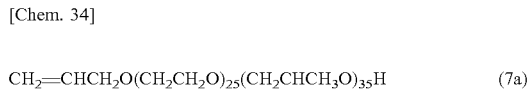

$CH_2$=$CHCH_2O(CH_2CH_2O)_{25}(CH_2CHCH_3O)_{35}H$ (7a)

and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound A of general formula (5a) below (weight-average molecular weight by GPC, 50,000) at a rate of conversion of at least 90% (Polyoxyalkylene-Modified Organopolysiloxane Compound A is a 29 wt % isopropanol solution). The molar ratio between alkenyl groups on the compound of formula (7a) and SiH groups on the compound of formula (8a) was (7a)/(8a)=1.1.

[Chem. 35]

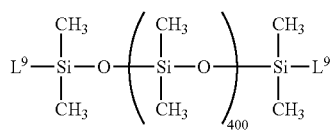
(5a)

L⁹: —C₃H₆O(CH₂CH₂O)₂₅(CH₂CHCH₃O)₃₅H

Surfactant-Solubilized Polyoxyalkylene-Modified Organopolysiloxane Compound A-1 was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound A (29 wt % isopropanol solution), and driving off under reduced pressure (10 to 15 mmHg, 50° C.) the isopropyl alcohol and the water contained in the nonionic surfactant TERGITOL-TMN6.

Next, 29 parts by weight (29 g) of a silicon-bonded hydrogen atom-containing organosiloxane of general formula (9a) below

[Chem. 36]

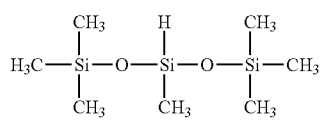
(9a)

(viscosity, 1 mm²/s; amount of hydrogen atoms bonded to silicon atoms, 0.48 mol/100 g), 71 parts by weight (71 g) of an unsaturated group-containing polyoxyalkylene compound of general formula (10a) below

[Chem. 37]

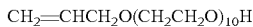

CH₂=CHCH₂O(CH₂CH₂O)₁₀H (10a)

and 50 parts by weight (50 g) of isopropyl alcohol were added, following which the system was heated, setting the internal temperature to 75° C. A toluene solution of a vinylsiloxane complex of platinum was then added in an amount of 5 ppm weight of platinum metal with respect to the siloxane and the system was stirred for 8 hours, thereby synthesizing a polyoxyalkylene-modified organosiloxane compound at a rate of conversion of at least 90%. Isopropyl alcohol was driven off under reduced pressure (10 to 15 mmHg and 50° C.), giving Polyoxyalkylene-Modified Organosiloxane Compound a of general formula (3a) below (weight-average molecular weight by GPC, 800). The molar ratio between the SiH groups on the compound of formula (9a) and the alkenyl groups on the compound of formula (10a) expressed as (10a)/(9a) was 1.1

[Chem. 38]

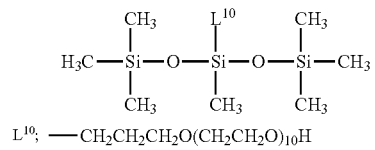
(3a)

L¹⁰: —CH₂CH₂CH₂O(CH₂CH₂O)₁₀H

Next, 30 parts by weight (30 g) of a di(hydroxydimethyl)-terminated polysiloxane of general formula (11a) below (viscosity, 7,000,000 mPa·s)

[Chem. 39]

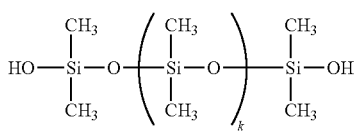
(11a)

(wherein k is a number that provides the indicated viscosity), 15 parts by weight (15 g) of Surfactant-Solubilized Polyoxyalkylene-Modified Organopolysiloxane Compound A-1 obtained above and 5 parts by weight (5 g) of Polyoxyalkylene-Modified Organosiloxane Compound a of general formula (3a) above were stirred for 180 minutes at 35 rpm and 20 to 60° C. in the Hivis Mix (Primix Corporation), thereby giving Emulsion Composition A. The average particle size, as measured with the Multisizer 3 from Beckman Coulter, was 8.5 μm.

Example 2

Emulsion Composition B was obtained by stirring the following for 180 minutes at 35 rpm and 20 to 60° C. in the Hivis Mix (Primix Corporation): 30 parts by weight (30 g) of a di(hydroxydimethyl)-terminated polysiloxane of general formula (11b) below (viscosity, 30,000,000 mPa·s)

[Chem. 40]

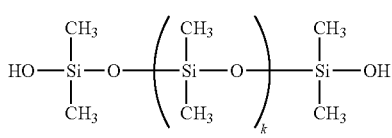
(11b)

(wherein k is a number that provides the indicated viscosity), 15 parts by weight (15 g) of Surfactant-Solubilized Polyoxyalkylene-Modified Organopolysiloxane Compound A-1 obtained in Example 1 and 5 parts by weight (5 g) of Polyoxyalkylene-Modified Organosiloxane Compound a of general formula (3a) obtained in Example 1. The average particle size, as measured with the Multisizer 3 from Beckman Coulter, was 10.5 μm.

Example 3

Surfactant-Solubilized Polyoxyalkylene-Modified Organopolysiloxane Compound A-2 was obtained by adding 50 parts by weight (50 g) of the nonionic surfactant Sannonic SS120 (a polyoxyethylene alkyl ether from Sanyo Chemical Industries, Ltd.; HLB, 14.5) to 350 parts by weight (350 g) of the Polyoxyalkylene-Modified Organopolysiloxane Compound A of general formula (5a) above (weight-average molecular weight by GPC, 50,000; 29% isopropanol solution) obtained in Example 1, and driving off the isopropyl alcohol under reduced pressure (10 to 15 mmHg, 50° C.).

Next, 30 parts by weight (30 g) of the di(hydroxydimethyl)-terminated polysiloxane of general formula (11b) above (viscosity, 30,000,000 mPa·s), 15 parts by weight (15 g) of the Surfactant-Solubilized Polyoxyalkylene-Modified Organopolysiloxane Compound A-2 obtained above and 5 parts by weight (5 g) of the Polyoxyalkylene-Modified Organosiloxane Compound a of general formula (3a) obtained in Example 1 were stirred for 180 minutes at 35 rpm and 20 to 60° C. in the Hivis Mix (Primix Corporation), thereby giving Emulsion Composition C. The average particle size, as measured with the Multisizer 3 from Beckman Coulter, was 12.5 μm.

Example 4

Under a nitrogen atmosphere, 79 parts by weight (79 g) of the silicon-bonded hydrogen atom-containing organopolysiloxane of general formula (8a) above (viscosity, 2,800 mm$^2$/s; amount of hydrogen atoms bonded to silicon atoms, 0.00625 mol/100 g), 21 parts by weight (21 g) of an unsaturated group-containing polyoxyalkylene compound of general formula (7b) below

[Chem. 41]

$$CH_2=CHCH_2O(CH_2CH_2O)_{50}(CH_2CHCH_3O)_{12}H \qquad (7b)$$

and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound B of general formula (5b) below (weight-average molecular weight by GPC, 50,000) at a rate of conversion of at least 90% (Polyoxyalkylene-Modified Organopolysiloxane Compound B is a 29 wt % isopropanol solution). The molar ratio between alkenyl groups on the compound of formula (7b) and SiH groups on the compound of formula (8a) was (7b)/(8a)=1.1.

[Chem. 42]

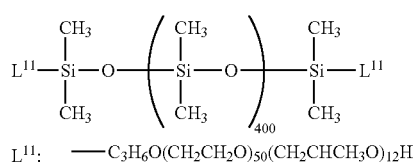

$L^{11}$: —C$_3$H$_6$O(CH$_2$CH$_2$O)$_{50}$(CH$_2$CHCH$_3$O)$_{12}$H

Surfactant-Solubilized Polyoxyalkylene-Modified Organopolysiloxane Compound B was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) and 50 parts by weight (50 g) of Polyoxyalkylene-Modified Organosiloxane Compound a of general formula (3a) above obtained in Example 1 to 350 parts by weight (350 g) of Polyoxyalkylene-Modified Organopolysiloxane Compound B (29 wt % isopropanol solution), and then driving off under reduced pressure (10 to 15 mmHg, 50° C.) the isopropyl alcohol and the water contained in the nonionic surfactant TERGITOL-TMN6.

Next, 30 parts by weight (30 g) of the di(hydroxydimethyl)-terminated polysiloxane of general formula (11b) above (viscosity, 30,000,000 mPa·s) and 20 parts by weight (20 g) of Surfactant-Solubilized Polyoxyalkylene-Modified Organopolysiloxane Compound B obtained above were stirred for 180 minutes at 35 rpm and 20 to 60° C. in the Hivis Mix (Primix Corporation), thereby giving Emulsion Composition D. The average particle size, as measured with the Multisizer 3 from Beckman Coulter, was 6.5 μm.

Example 5

Emulsion Composition E was obtained by adding 5 parts by weight (5 g) of water to 45 parts by weight (45 g) of Emulsion Composition D obtained in Example 4 and stirring for 30 minutes at 20 to 30 rpm and 20 to 60° C. in the Hivis Mix (Primix Corporation). The average particle size, as measured with the Multisizer 3 from Beckman Coulter, was 6.3 μm.

Example 6

Under a nitrogen atmosphere, 57 parts by weight (57 g) of the silicon-bonded hydrogen atom-containing organopolysiloxane of general formula (8b) below

[Chem. 43]

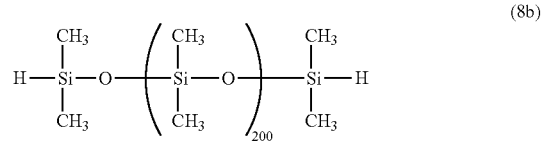

(viscosity, 450 mm$^2$/s; amount of hydrogen atoms bonded to silicon atoms, 0.014 mol/100 g), 43 parts by weight (43 g) of an unsaturated group-containing polyoxyalkylene compound of general formula (7b) below

[Chem. 44]

$$CH_2=CHCH_2O(CH_2CH_2O)_{50}(CH_2CHCH_3O)_{12}H \qquad (7b)$$

and 200 parts by weight (200 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound C of general formula (5c) below (weight-average molecular weight by GPC, 30,000) at a rate of conversion of at least 90% (Polyoxyalkylene-Modified Organopolysiloxane Compound C is a 33 wt % isopropanol solution). The molar ratio between alkenyl groups on the compound of formula (7b) and SiH groups on the compound of formula (8b) was (7b)/(8b)=1.1.

[Chem. 45]

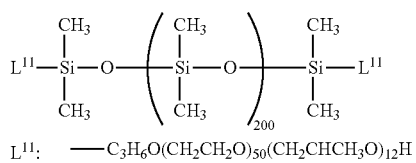

(5c)

Surfactant-Solubilized Polyoxyalkylene-Modified Organopolysiloxane Compound C was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) and 50 parts by weight (50 g) of Polyoxyalkylene-Modified Organosiloxane Compound a of general formula (3a) above obtained in Example 1 to 300 parts by weight (300 g) of Polyoxyalkylene-Modified Organopolysiloxane Compound C (33 wt % isopropanol solution), and then driving off under reduced pressure (10 to 15 mmHg, 50° C.) the isopropyl alcohol and the water contained in the nonionic surfactant TERGITOL-TMN6.

Next, 30 parts by weight (30 g) of the di(hydroxydimethyl)-terminated polysiloxane of general formula (11b) above (viscosity, 30,000,000 mPa·s) and 20 parts by weight (20 g) of Surfactant-Solubilized Polyoxyalkylene-Modified Organopolysiloxane Compound C obtained above were stirred for 180 minutes at 35 rpm and 20 to 60° C. in the Hivis Mix (Primix Corporation), thereby giving Emulsion Composition F. The average particle size, as measured with the Multisizer 3 from Beckman Coulter, was 5.8 µm.

Comparative Example 1

Emulsion Composition G was obtained by stirring 35 parts by weight (35 g) of the di(hydroxydimethyl)-terminated polysiloxane of general formula (11b) above (viscosity, 30,000,000 mPa·s) and 15 parts by weight (15 g) of Surfactant-Solubilized Polyoxyalkylene-Modified Organopolysiloxane Compound A-1 obtained in Example 1 for 180 minutes at 35 rpm and 20 to 60° C. in the Hivis Mix (Primix Corporation). The average particle size, as measured with the Multisizer 3 from Beckman Coulter, was 5.5 µm.

Comparative Example 2

Under a nitrogen atmosphere, 33 parts by weight (33 g) of the silicon-bonded hydrogen atom-containing organopolysiloxane of general formula (8c) below

[Chem. 46]

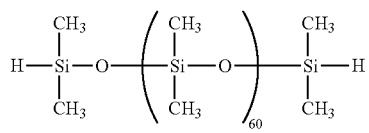

(8c)

(viscosity, 75 mm²/s; amount of hydrogen atoms bonded to silicon atoms, 0.05 mol/100 g), 67 parts by weight (67 g) of the unsaturated group-containing polyoxyalkylene compound of general formula (7a) above, and 250 parts by weight (250 g) of isopropyl alcohol were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound D of general formula (5d) below (weight-average molecular weight by GPC, 16,000) at a rate of conversion of at least 90% (Polyoxyalkylene-Modified Organopolysiloxane Compound D is a 29 wt % isopropanol solution). The molar ratio between alkenyl groups on the compound of formula (7a) and SiH groups on the compound of formula (8c) was (7a)/(8c)=1.1.

[Chem. 47]

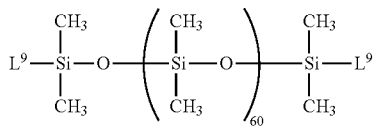

(5d)

Surfactant-Solubilized Polyoxyalkylene-Modified Organopolysiloxane Compound D was obtained by adding 60 parts by weight (60 g) of the nonionic surfactant TERGITOL-TMN6 (from Dow Chemical; a 90 wt % aqueous solution of polyoxyethylene alkyl ether; HLB, 13.1) to 350 parts by weight (350 g) of Polyoxyalkylene-Modified Organopolysiloxane Compound D (29 wt % isopropanol solution), and then driving off under reduced pressure (10 to 15 mmHg, 35 to 40° C.) the isopropyl alcohol and the water contained in the nonionic surfactant TERGITOL-TMN6.

Next, 30 parts by weight (30 g) of the di(hydroxydimethyl)-terminated polysiloxane of general formula (11b) above (viscosity, 30,000,000 mPa·s), 15 parts by weight (15 g) of Surfactant-Solubilized Polyoxyalkylene-Modified Organopolysiloxane Compound D obtained above and 5 parts by weight (5 g) of Polyoxyalkylene-Modified Organosiloxane Compound a of general formula (3a) obtained in Example 1 were stirred for 180 minutes at 20 to 35 rpm and 20 to 60° C. in the Hivis Mix (Primix Corporation), thereby giving Emulsion Composition H. The average particle size, as measured with the Multisizer 3 from Beckman Coulter, was 3.5 µm.

Comparative Example 3

Under a nitrogen atmosphere, 5.0 parts by weight (5.0 g) of the silicon-bonded hydrogen atom-containing organopolysiloxane of general formula (9a) above (viscosity, 1 mm²/s; amount of hydrogen atoms bonded to silicon atoms, 0.48 mol/100 g) and 95.0 parts by weight (95.0 g) of the unsaturated group-containing polyoxyalkylene compound of general formula (7a) above were added together and then heated, bringing the internal temperature to 75° C. Next, a toluene solution of a vinylsiloxane complex of platinum was added in an amount of 5 ppm weight of platinum metal with respect to the siloxane and the system was stirred for 8 hours, thereby synthesizing Polyoxyalkylene-Modified Organopolysiloxane Compound b of general formula (3b) below (weight-average molecular weight by GPC, 7,000) at a rate of conversion of at least 90%. The molar ratio between alkenyl groups on the compound of formula (7a) and SiH groups on the compound of formula (9a) was (7a)/(9a)=1.1.

[Chem. 48]

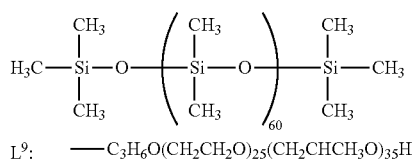

(3b)

L⁹: —C₃H₆O(CH₂CH₂O)₂₅(CH₂CHCH₃O)₃₅H

Next, 30 parts by weight (30 g) of the di(hydroxydimethyl)-terminated polysiloxane of general formula (11b) above (viscosity, 30,000,000 mPa·s), 15 parts by weight (15 g) of Surfactant-Solubilized Polyoxyalkylene-Modified Organopolysiloxane Compound A-1 obtained in Example 1 and 5 parts by weight (5 g) of Polyoxyalkylene-Modified Organopolysiloxane Compound b of general formula (3b) below were stirred for 180 minutes at 35 rpm and 20 to 60° C. in the Hivis Mix (Primix Corporation), thereby giving Emulsion Composition I. The average particle size, as measured with the Multisizer 3 from Beckman Coulter, was 4.5 μm.

Comparative Example 4

Emulsion Composition J was obtained by stirring 30 parts by weight (30 g) of the di(hydroxydimethyl)-terminated polysiloxane of general formula (11c) below having a viscosity of 100,000 mPa·s

[Chem. 49]

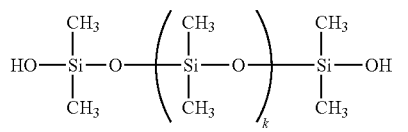

(11c)

(wherein k is a number that provides the indicated viscosity), 15 parts by weight (15 g) of Surfactant-Solubilized Polyoxyalkylene-Modified Organopolysiloxane Compound A-1 obtained above in Example 1 and 5 parts by weight (5 g) of Polyoxyalkylene-Modified Organosiloxane Compound a of general formula (3a) obtained in Example 1 for 180 minutes at 20 to 35 rpm and 20 to 60° C. in the Hivis Mix (Primix Corporation). The average particle size, as measured with the Multisizer 3 from Beckman Coulter, was 4.5 μm.

The following evaluations of water dilution stability, solvent dilution stability, blushing and leveling ability were carried out for each of the above Examples and Comparative Examples. The results are shown in Tables 1 and 2.

Water Dilution Stability:

Dilution stability tests were carried out on each of Emulsion Compositions A to J. In the respective tests, Emulsion Compositions A to J in amounts of 0.5 g were placed together with 9.5 g of deionized water in a glass bottle, and the bottle was shaken and subsequently left to stand for one day. The appearance was then examined and rated according to the following criteria.

○: The emulsion composition dispersed in water, with substantially no separation of the organopolysiloxane x: Some of the emulsion composition dispersed in water and some of the organopolysiloxane separated out or an interference film formed on the water surface Solvent Dilution Stability:

Solvent resistance tests were carried out on each of Emulsion Compositions A to J.

In the respective tests, Emulsion Compositions A to J in amounts of 0.5 g were placed together with 9.5 g of dimethylformamide (DMF) in a glass bottle, the bottle was shaken and the state of the solution was examined. The solvent resistance was rated according to the following criteria.

○: The emulsion composition dispersed in DMF, with substantially no separation of the organopolysiloxane x: Some of the organopolysiloxane separated out and some of the emulsion composition dispersed in the DMF Blushing 1 and Leveling Ability 1:

Blushing 1 and Leveling Ability 1 tests were carried out on each of Emulsion Compositions A to J.

Emulsion Compositions A to J were diluted with water so as to form 20 wt % aqueous solutions. Next, 10 g of a water-based acrylic resin (40-418EF, from DIC Corporation) and 0.25 g of the respective 20 wt % aqueous solutions of Emulsion Compositions A to J were placed in glass bottles and uniformly mixed by shaking. In each test, 1.5 g of the emulsion composition-containing water-based acrylic resin was placed in a 6 cm diameter aluminum Petri dish and spread over the entire dish. This was heated at 105° C. for 3 minutes, following which the appearance was visually checked and rated for blushing and for leveling ability according to the following criteria.

Blushing 1

○: Film is in a clear state with substantially no clouding

Δ: Film is in a slightly clouded state x: Film is in a clouded state

Leveling Ability 1

○: Film is in a uniform state with no surface irregularities x: Film has surface irregularities Blushing 2 and Leveling Ability 2:

Blushing 2 and Leveling Ability 2 tests were carried out on each of Emulsion Compositions A to J.

Emulsion Compositions A to J were diluted with DMF so as to form 20 wt % DMF solutions. Next, 10 g of a DMF solvent-based polyurethane resin (Sanprene LQ-258 from Sanyo Chemical Industries, Ltd.) and 0.25 g of the respective 20 wt % DMF solutions of Emulsion Compositions A to J were placed in glass bottles and uniformly mixed by shaking. In each test, 1.5 g of the emulsion composition-containing DMF solvent-based polyurethane resin was placed in a 6 cm diameter aluminum Petri dish and spread over the entire dish. This was heated at 50° C. for 30 minutes, following which the appearance was visually checked and rated for blushing and for leveling ability according to the following criteria.

Blushing 2

○: Film is in a clear state with substantially no clouding

Δ: Film is in a slightly clouded state x: Film is in a clouded state

Leveling Ability 2

○: Film is in a uniform state with no surface irregularities x: Film has surface irregularities

TABLE 1

| | Example | | | | | |
|---|---|---|---|---|---|---|
| | 1 | 2 | 3 | 4 | 5 | 6 |
| Emulsion composition | A | B | C | D | E | F |
| Water dilution stability | ○ | ○ | ○ | ○ | ○ | ○ |
| Solvent dilution stability | ○ | ○ | ○ | ○ | ○ | ○ |
| Blushing 1 | ○ | ○ | ○ | ○ | ○ | ○ |
| Leveling Ability 1 | ○ | ○ | ○ | ○ | ○ | ○ |
| Blushing 2 | ○ | ○ | ○ | ○ | ○ | ○ |
| Leveling Ability 2 | ○ | ○ | ○ | ○ | ○ | ○ |

TABLE 2

| | Comparative Example | | | |
|---|---|---|---|---|
| | 1 | 2 | 3 | 4 |
| Emulsion composition | G | H | I | J |
| Water dilution stability | X | ○ | x | ○ |
| Solvent dilution stability | ○ | ○ | ○ | ○ |
| Blushing 1 | ○ | Δ | ○ | Δ |
| Leveling ability 1 | ○ | X | X | ○ |
| Blushing 2 | ○ | Δ | ○ | Δ |
| Leveling ability 2 | ○ | X | X | ○ |

The invention claimed is:

1. An organopolysiloxane emulsion composition comprising:
   (A) from 1 to 50 parts by weight of a polyoxyalkylene-modified organopolysiloxane compound of general formula (1) below $$(LR_2SiO_{1/2})_a(R_3SiO_{1/2})_b(R_2SiO_{2/2})_c(RSiO_{3/2})_d(SiO_{4/2})_e \quad (1)$$

wherein each R, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms or an alkoxy group of 1 to 20 carbon atoms; the subscript a is an integer from 2 to 4; b is an integer from 0 to 2; c is an integer from 100 to 1,000; d is 0 or 1; and e is 0 or 1;
wherein L is a monovalent organic group of general formula (2) below $$-CH_2-CH_2-(CH_2)_{r1}-O-(EO)_{s1}-(AO)_{t1}-R^1 \quad (2)$$

EO being an oxyethylene group; AO being a linear or branched oxyalkylene group of 3 to 10 carbon atoms; $R^1$ being a linear or branched, substituted or unsubstituted alkyl group of 1 to 10 carbon atoms, a hydrogen atom, a carboxyl group, an acyl group of 2 to 10 carbon atoms or a phenyl group; r1 being an integer from 0 to 10; s1 being an integer from 1 to 100; t1 being an integer from 0 to 150; and the sum s1+t1 being 15 or more;
   (B) from 1 to 50 parts by weight of a polyoxyalkylene-modified organosiloxane compound of general formula (3) below

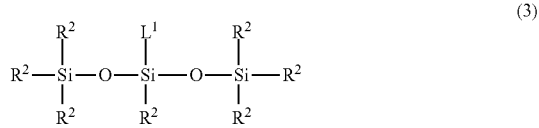

wherein $L^1$ is a monovalent organic group of general formula (4) below $$-CH_2-CH_2-(CH_2)_{r2}-O-(EO)_{s2}-(AO)_{t2}-R^3 \quad (4)$$

EO being an oxyethylene group; AO being a linear or branched oxyalkylene group of 3 to 10 carbon atoms; $R^3$ being a linear or branched, substituted or unsubstituted alkyl group of 1 to 10 carbon atoms, a hydrogen atom, a carboxyl group, an acyl group of 2 to 10 carbon atoms or a phenyl group; r2 being an integer from 0 to 10, s2 being an integer from 1 to 15, t2 being an integer from 0 to 15, and the sum s2+t2 being from 3 to 20; and each $R^2$, which may be the same or different, is a hydroxyl group, a linear or branched, substituted or unsubstituted alkyl group of 1 to 20 carbon atoms, an aryl group of 6 to 20 carbon atoms, an aralkyl group of 7 to 20 carbon atoms, or an alkoxy group of 1 to 20 carbon atoms;
   (C) from 0 to 50 parts by weight of a surfactant;
   (D) 100 parts by weight of an organopolysiloxane having the average compositional formula (12) below and a viscosity at 25° C. of at least 1,000,000 mPa·s $$R^4_f SiO_{(4-f)/2} \quad (12)$$

wherein each $R^4$, which may be the same or different, is a hydrogen atom, a hydroxyl group, a linear or branched, unsubstituted or halogen atom, hydroxyl group, amino group or aminoalkylamino group-substituted alkyl group of 1 to 20 carbon atoms, an alkenyl group of 2 to 20 carbon atoms, an aryl group of 6 to 20 carbon atoms or an aralkyl group of 7 to 20 carbon atoms; and f is a positive number from 1.8 to 2.2; and
   (E) from 0 to 10,000 parts by weight of water.

2. The organopolysiloxane emulsion composition of claim 1, wherein the polyoxyalkylene-modified organopolysiloxane compound (A) is a polyoxyalkylene-modified organopolysiloxane compound having a monovalent organic group L of general formula (5) below at both ends

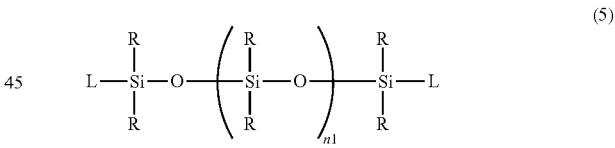

wherein L and R are as defined above, and n1 is an integer from 100 to 1,000.

3. The organopolysiloxane emulsion composition of claim 1, wherein the organopolysiloxane (D) has a viscosity at 25° C. of at least 5,000,000 mPa·s.

4. The organopolysiloxane emulsion composition of claim 1, wherein the emulsion in the emulsion composition has an average particle size of not more than 20 μm.

5. The organopolysiloxane emulsion composition of claim 1 wherein, in the organopolysiloxane (D), the $R^4$ group of formula (12) is a methyl group, a phenyl group or a hydroxyl group.

6. A resin composition comprising an organic solvent or aqueous dispersion of a resin selected from the group consisting of urethane resins, epoxy resins, phenolic resins, melamine resins, urea resins, alkyd resins, polyimide resins, polyethylene, polypropylene, polyvinyl chloride, polystyrene, polyvinyl acetate, polytetrafluoroethylene, acrylonitrile-butadiene-styrene resins, acrylonitrile-styrene resins and acrylic resins; and the organopolysiloxane emulsion composition of claim 1.

\* \* \* \* \*